US012269915B2

(12) United States Patent
De Wolf et al.

(10) Patent No.: US 12,269,915 B2
(45) Date of Patent: Apr. 8, 2025

(54) NON AQUEOUS CROSSLINKABLE COMPOSITION

(71) Applicant: Allnex Netherlands B.V., Bergen Op Zoom (NL)

(72) Inventors: Elwin De Wolf, Hoogerheide (NL); Bart Noordover, Bergen op Zoom (NL); Francesca Fallani, Dordrecht (NL); Sharon Maas, Tilburg (NL); Ronald Koeken, Etten-Leur (NL)

(73) Assignee: ALLNEX NETHERLANDS BV, Bergen Op Zoom (NL)

( * ) Notice: Subject to any disclaimer, the term of this patent is extended or adjusted under 35 U.S.C. 154(b) by 129 days.

(21) Appl. No.: 17/782,745

(22) PCT Filed: Dec. 17, 2020

(86) PCT No.: PCT/EP2020/086750
§ 371 (c)(1),
(2) Date: Jun. 6, 2022

(87) PCT Pub. No.: WO2021/122978
PCT Pub. Date: Jun. 24, 2021

(65) Prior Publication Data
US 2023/0026705 A1    Jan. 26, 2023

(30) Foreign Application Priority Data
Dec. 19, 2019 (EP) .................................... 19218048

(51) Int. Cl.
| | |
|---|---|
| C08G 18/62 | (2006.01) |
| C08G 18/28 | (2006.01) |
| C08G 18/79 | (2006.01) |
| C08K 5/21 | (2006.01) |
| C08L 75/02 | (2006.01) |
| C09D 5/00 | (2006.01) |
| C09D 7/40 | (2018.01) |
| C09D 7/42 | (2018.01) |
| C09D 7/65 | (2018.01) |
| C09D 167/00 | (2006.01) |
| C09D 175/02 | (2006.01) |
| C09D 175/04 | (2006.01) |

(52) U.S. Cl.
CPC ..... *C08G 18/6225* (2013.01); *C08G 18/2865* (2013.01); *C08G 18/6229* (2013.01); *C08G 18/792* (2013.01); *C08K 5/21* (2013.01); *C08L 75/02* (2013.01); *C09D 5/006* (2013.01); *C09D 7/42* (2018.01); *C09D 7/65* (2018.01); *C09D 7/69* (2018.01); *C09D 167/00* (2013.01); *C09D 175/02* (2013.01); *C09D 175/04* (2013.01)

(58) Field of Classification Search
CPC ............ C08G 18/6225; C08G 18/2865; C08G 18/792; C08G 18/6229; C09D 7/42; C09D 7/69; C09D 175/02; C09D 5/006; C09D 167/00; C09D 175/04; C09D 7/65; C08K 5/21; C08L 75/02
See application file for complete search history.

(56) References Cited

U.S. PATENT DOCUMENTS

| | | | |
|---|---|---|---|
| 2,759,913 | A | 8/1956 | Hulse |
| 4,217,396 | A | 8/1980 | Heckles |
| 4,311,622 | A | 1/1982 | Buter |
| 4,408,018 | A | 10/1983 | Bartman et al. |
| 4,602,061 | A | 7/1986 | Akkerman |
| 4,851,294 | A | 7/1989 | Buter et al. |
| 4,871,822 | A | 10/1989 | Brindopke et al. |
| 5,314,982 | A | 5/1994 | Rasp et al. |
| 5,571,623 | A | 11/1996 | Kuriyama et al. |
| 6,486,298 | B1 | 11/2002 | Jallouli et al. |
| 6,649,687 | B1 | 11/2003 | Gheewala et al. |
| 2003/0180539 | A1 | 9/2003 | Rockrath et al. |
| 2014/0378587 | A1 | 12/2014 | Weiher et al. |

FOREIGN PATENT DOCUMENTS

| | | |
|---|---|---|
| DE | 835809 | 4/1952 |
| EP | 0 192 304 | 8/1986 |
| EP | 0 435 306 | 7/1991 |
| EP | 0 501 348 | 9/1992 |
| EP | 0 665 219 | 8/1995 |
| JP | 5-155967 | 6/1993 |
| JP | 2629747 | 7/1997 |
| WO | 2011/124663 | 10/2011 |
| WO | 2011/124664 | 10/2011 |
| WO | 2011/124665 | 10/2011 |
| WO | 2013/050574 | 4/2013 |
| WO | 2013/050622 | 4/2013 |
| WO | 2013/050623 | 4/2013 |
| WO | 2013/050624 | 4/2013 |
| WO | 2014/166880 | 10/2014 |
| WO | 2016/166361 | 10/2016 |
| WO | 2016/166381 | 10/2016 |
| WO | 2016/166382 | 10/2016 |
| WO | 2018/005077 | 1/2018 |

OTHER PUBLICATIONS

International Search Report (ISR) issued Apr. 20, 2021 in International (PCT) Application No. PCT/EP2020/086750.

*Primary Examiner* — Rabon A Sergent
(74) *Attorney, Agent, or Firm* — Wenderoth, Lind & Ponack, L.L.P.

(57) ABSTRACT

A particulate polyurea compound a2) for reducing gloss of coatings, a resin composition and a crosslinkable composition comprising the particulate polyurea compound is provided, wherein the volume percentage of particles of the particulate polyurea compound having a diameter of smaller than 10 μm is equal or less than 40%, and the volume percentage of the polyurea product having a diameter larger than 20 μm is equal or more than 11%.

20 Claims, 1 Drawing Sheet

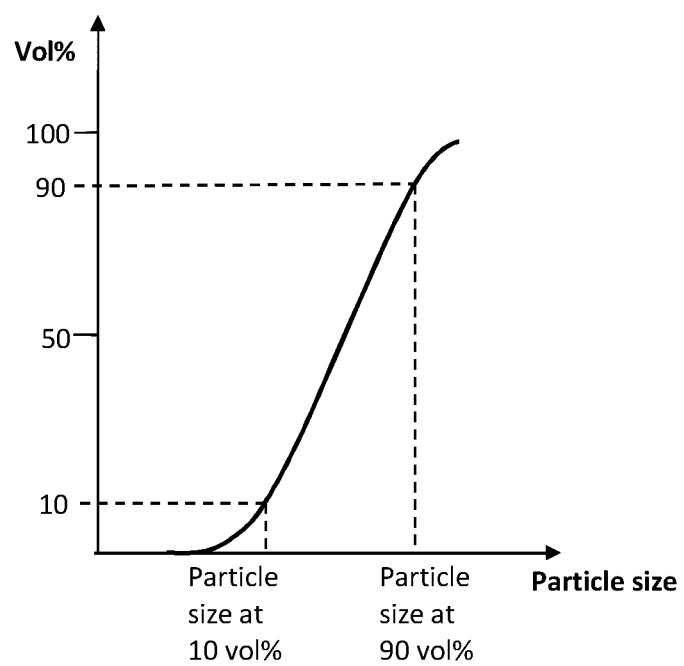

NON AQUEOUS CROSSLINKABLE COMPOSITION

TECHNICAL FIELD

The invention relates to a particulate polyurea compound and a resin composition comprising such polyurea compound, that can provide coatings with reduced gloss. Furthermore, the invention relates to a crosslinkable composition comprising such resin composition; a method for coating a substrate with said crosslinkable composition to obtain substrates with coatings having reduced gloss; and to substrates coated with said crosslinkable compositions having a reduced gloss.

BACKGROUND ART

It is generally known that delustering of especially high solids (crosslinkable) compositions is difficult to achieve with conventional technologies such as silica-based additives, waxes or micronized polymeric delustering agents, requiring high loading of such delustering additives to reach low gloss values. It is generally known that use of high loadings of silica-based delustering agents results in low resistance to several chemicals and low stability of the paint. Therefore, there is a need to improve the formulation stability as well as the mechanical and chemical resistance of low gloss coatings. In addition, obtaining a consistent delustering performance as a function of the coating film thickness is often problematic and handling of silica-based gloss reduction agents is typically cumbersome. Also, the durability and transparency of coatings containing silica-based additives are often not optimal. Furthermore, it is known that in paints cured by actinic radiation, obtaining a good delustering effect is particularly difficult, especially in combination with good performance of other important coating properties. Finally, in base-catalyzed paint systems, the acidic nature of many conventional delustering agents may strongly inhibit the drying performance of said paints. Also in other two component systems these agents may inhibit the drying performance of said paints.

The use of polyurea based compounds as rheological agent in film forming resin is known in the art. Polyurea compounds can be used as sag control agents see e.g. U.S. Pat. Nos. 4,851,294, 4,311,622, US20140378587 or EP Pub. No. 01 92 304. US20030180539 describes the use of urea crystals as thixotropic agent in compositions which are curable using actinic radiation. In all these compositions, the polyurea based compounds are used to control the rheology of applied paints, and more specifically to prevent the sagging of paint. These compounds have, in general, a very small average particle size, typically well below 10 μm, and narrow particle size distributions. However, these polyurea particles known in the prior art do not decrease the gloss of coating compositions.

JP2629747 describes urea-based organic gloss modifiers in different resin solutions and demonstrates that the gloss of coatings resulting from the application of such compositions can be effectively reduced. Also, improved paint stability and abrasion resistance are described. However, the presented systems in JP2629747 have low non-volatile contents ranging between 15 and 20 wt %, meaning that such systems have very high Volatile Organic Compound (VOC) contents, which is not preferred from an environmental and health perspective. Furthermore the urea polymers described are prepared from near-stoichiometric amounts of diamine and diisocyanate monomers, resulting in linear chain, relatively high molecular weight species containing many urea linkages. The molecular weight and the number of urea linkages in such systems are difficult to control and lead to a broad particle size distribution and, hence, limited control of the final gloss of the delustered coating composition. Furthermore, the lack of control of the particle size distribution leads to the presence of a high percentage of very large particles, which have a diameter larger than the applied dry film thickness of the coating, resulting in lump defects in the final coating.

Therefore, there is a clear need for compositions providing a robust, tunable delustering effect, combined with good chemical and mechanical stability, good film transparency and durability and which are also applicable at high solids contents.

SUMMARY OF INVENTION

Applicants have now surprisingly found a compound and a new composition that overcomes above mentioned problems, at least partially, if not completely, by providing a particulate polyurea compound a2) as described in claim 1. Accordingly, a first aspect of the invention is related to a particulate polyurea compound a2) for reducing gloss of coatings, wherein:
  the particulate polyurea compound a2) comprises on average at least two and at most six urea bonds per molecule (or an average number of urea bonds of at least two and at most six urea bonds per molecule),
  the average particle size of the polyurea compound a2) is from 11 to 80 μm, and
  the volume percentage of particles of the particulate polyurea compound a2) having a diameter of smaller than 10 μm is equal or less than 40%, preferably less than 30%, more preferably less than 25%, and the volume percentage of particles of the polyurea product (or polyurea compound a2)) having a diameter larger than 20 μm is equal or more than 11%, preferably more than 15%, more preferably more than 25%, and most preferably more than 40% (based on particle size distribution data measured using a laser diffraction apparatus).

In the context of the present description, polyurea compound a2) is also referred to as polyurea product. In the context of the present description, urea bond is also referred to as urea group or urea linkage. In the context of the present description, a molecule is defined as an electrically neutral group of atoms held together by covalent chemical bonds. The volume percentage of the particles (of the particulate polyurea compound a2)) of a certain diameter is measured through laser diffraction using a Malvern Mastersizer S.

A second aspect is related to a resin composition A comprising a film forming resin a1) comprising at least two functional groups, each functional group having a functionality of at least 1, and/or at least one functional group having a functionality of at least 2; the particulate polyurea compound a2) of the invention; optionally, a dispersing agent a3); and optionally, one or more of a compound a4) different from a1), a2) and a3).

In the context of the present description, the functionality of a functional group refers to the number of single covalent bonds the functional group can form with another functional group (of a different type or of the same type), more particularly, the number of single covalent bonds the functional group can form (or forms) with another functional group of a different type, or of the same type, in a certain chosen reactive curing chemistry (i.e. when undergoing a certain type of curing). For example, an hydroxyl functional group has a functionality of 1 in reactions with an isocyanate functional group or with a carboxylic acid functional group. An acryloyl functional group for example has a functionality of 1 when reacted with an acidic malonate C—H through Michael addition, but the same acryloyl functional group has a functionality of 2 when reacted with other acryloyl functional groups (i.e. of the same type) or with another type of ethylenically unsaturated moiety in the presence of radical initiators or under the influence of actinic radiation.

In the context of the present description, the wording "at least one" refers to one, two, three, or more. In the context of the present description, the wording "at least two" refers to two, three, or more.

It is surprisingly found that the use of such particulate polyurea compound a2) and such resin composition A comprising the particulate polyurea compound a2) allows to obtain a crosslinkable coating composition having reduced gloss, combined with improved durability and chemical resistance after application and curing. The resin composition A is highly suitable to be formulated in a crosslinkable composition, especially crosslinkable compositions with a low content of volatile organic components and high solids. Furthermore, the resulting crosslinked composition provides good mechanical properties, an excellent appearance and a very good stability of the delustering effect as a function of dry film thickness. It is particularly surprising that with this crosslinkable composition a low increase of gloss upon scratching the coating was obtained and that the crosslinkable composition provides much less whitening upon exposure to water and sunlight (when compared to compositions comprising conventional delustering additives known in the art). Furthermore, it was found that the polyurea compound a2) according to the invention has no significant negative influence, or even has a positive influence, on tack-free time and has excellent Xenon resistance. More in particular, the resin composition A with the polyurea compounds according to the invention can be used in well-known crosslinkable compositions like liquid two-component coating systems such as two-component polyurethane (2K PU) and Real Michael Addition (RMA) crosslinkable compositions. Also, the resin composition A with the polyurea compound a2) according to the invention can be used in crosslinkable liquid coatings systems such as UV curable or other actinic radiation curable compositions. In addition, it was found that said polyurea particles in the resin composition A do not negatively affect the curing of the crosslinkable composition of the liquid two-component coating systems such as two-component polyurethane (2K PU) and Real Michael Addition (RMA) curable compositions and that these crosslinkable compositions are shelf stable. Furthermore, it was also found that the resin composition A comprising the polyurea compound a2) facilitates easier formulation of low gloss paint formulations used in e.g. wood applications. These paint formulations typically would have a low solids content of preferably between 15 and 45%. Such paints for application on wood are typically delustered using conventional silica and/or wax gloss reducing agents and often contain Cellulose Acetate Butyrate (CAB) compounds to impart a suitable rheological behavior to the paint. It was found that the resin composition A comprising the particulate polyurea compound of the invention can be applied at the mentioned lower solids without using these CAB additives and still have the required rheological behavior. In addition, it was found that the absence of CAB in the crosslinkable composition of the invention provides an improved delustering effect and an improved stability of the delustering effect as a function of the number of applied layers. Also, the particulate urea compound according to the invention provides improved delustering effect at viewing angles close to the horizontal plane (i.e. gloss reduction at 85° angle) compared to well-known silica-based delustering agents already described in the art.

In the context of the present description, delustering agent is also referred to as delustering composition, delustering compound, or delustering additive.

Therefore, a third aspect of the invention is related to a crosslinkable composition comprising the resin composition A of the invention, and further
a film forming resin b) and/or a film forming resin a1'),
optionally, a crosslinker c),
optionally, a catalyst d) for catalyzing the reaction of the functional groups of film forming resin a1) and/or film forming resin b) with crosslinker c) if present, and/or with film forming resin b) and/or with film forming resin a1'),
optionally, a reactivity moderator e),
optionally, a volatile organic compound f),
optionally, a reactive diluent g),
optionally, another resin h),
optionally, another delustering composition i) that is different from or the same as particulate polyurea compound a2), preferably, delustering composition i) is different from particulate polyurea compound a2),
wherein the film forming resin a1), a1'), and b), and crosslinker c) if present, comprises at least two functional groups, each functional group having a functionality of at least 1, and/or at least one functional group having a functionality of at least 2; wherein the film forming resin a1), and/or film forming resin a1'), and/or film forming resin b) is reactable with film forming resin b) and/or film forming resin a1') and/or crosslinker c) if present; and wherein film forming resin a1') and film forming resin b) are different from or the same as film forming resin a1). Film forming resin a1') is part of a resin composition A' described further below.

Preferably, the crosslinkable composition is able to provide a coating with reduced gloss having a gloss measurement of at most 45 gloss units, preferably at most 30 gloss units, more preferably at most 20 gloss units at a 60° angle (as determined using a BYK Haze-gloss meter) when applied at a Dry Film Thickness (DFT) of between 50 and 60 μm (as measured using a Fischer Permascope MP40E-S).

In a fourth aspect, present invention relates to a process for coating an article or a substrate with the crosslinkable composition according to the invention and in a fifth aspect to substrates coated with the crosslinkable composition of the invention. The coated substrate has a reduced gloss having a gloss measurement of at most 45 gloss units, preferably at most 30 gloss units, more preferably at most 20 gloss units at a 60° angle (as determined using a BYK Haze-gloss meter) when applied at a Dry Film Thickness (DFT) of between 50 and 60 μm (as measured using a Fischer Permascope MP40E-S).

BRIEF DESCRIPTION OF THE FIGURES

Aspects of the invention will now be described in more detail. Reference is thereby made to the appended FIGURE, i.e.

FIG. 1 displaying a representation of a particle size distribution showing the Vol % of particles of a particulate polyurea compound in view of the particle size.

DESCRIPTION OF EMBODIMENTS

Particulate Polyurea Compound a2)

The first aspect of the invention is related to a particulate polyurea compound a2). The particulate polyurea compound a2) can be used in a crosslinkable composition, which composition, after applying on a substrate and after drying forms a coating.

The particulate polyurea compound a2) according to the invention comprises on average at least two and at most six urea bonds per molecule. The particulate polyurea compound a2) according to the invention is able to reduce gloss of coatings. The volume percentage of particles of the particulate polyurea compound having a diameter of smaller than 10 µm is equal or less than 40%, preferably less than 30%, more preferably less than 25%, and the volume percentage of particles of the polyurea product having a diameter larger than 20 µm is equal or more than 11%, preferably more than 15%, more preferably more than 25%, and most preferably more than 40%. The average particle size of the particulate polyurea compound a2) is in the range from 11 µm to 80 µm.

In one embodiment, the average particle size of the particulate polyurea compound is in the range from 11 µm to 80 µm, preferably in the range from 15 µm to 80 µm, more preferably between 15 and 60 µm, most preferably between 19 and 41 µm.

In another embodiment, the particulate polyurea compound a2) has a particle size distribution, where the volume percentage of particles with a diameter smaller than 10 µm is in the range of between 0 and 40%, preferably between 0 and 30%, more preferably between 0 and 25%. The volume percentage of particles with a diameter larger than 20 µm is in the range of between 11 and 100%, preferably between 15 and 100%, more preferably between 25 and 80%, most preferably between 40 and 70%.

Preferably, the particulate polyurea compound a2) is not crosslinked.

Preferably, the particulate polyurea compound a2) has a weight averaged molecular weight of between 200 and 10,000 Dalton, more preferably of between 280 and 7,500 Dalton, even more preferably of between 380 and 4,500 Dalton, and most preferably of between 380 and 3,000 Dalton.

Preferably, the polyurea compound a2) has a melting point which is higher than the temperature at which the crosslinkable composition is cured. More preferably, the difference between the melting point of polyurea compound a2) and the curing temperature of the crosslinkable composition is more than 10° C., more preferably more than 20° C., most preferably more than 30° C.

Preferably, the melting point of polyurea compound a2) is less than 250° C., more preferably less than 200° C., even more preferably less than 150° C., and most preferably less than 100° C.

Melting points of the polyurea compound a2) can be measured according to ASTM E324.

In one embodiment, the volume percentage of particles of the particulate polyurea compound a2) that are larger than twice the thickness of crosslinkable composition applied on a substrate after drying is smaller than 10%, preferably smaller than 5%, more preferably smaller than 1% or 0.5%, and is most preferably 0%. It has been found in the present application that, in case more than 10 vol % of particles of the particulate polyurea compound has a diameter larger than twice the thickness of the dried crosslinkable composition (i.e. coating), this will lead to lump defects in the coating and, hence, poor coating appearance.

In another embodiment, the volume percentage of particles of the particulate polyurea compound a2) that are larger than the thickness of crosslinkable composition applied on a substrate after drying is smaller than 10%, preferably smaller than 5%, more preferably smaller than 1% or 0.5%, and is most preferably 0%.

According to this invention, with volume percentage or Vol % or volume fraction is meant the volume of the particles of the particulate polyurea compound having a certain particle size (or diameter), or a particle size range in the particle size distribution, relative to the total volume of the particulate polyurea compound. More particularly, with volume percentage or Vol % or volume fraction is meant the percentage that each particle size class occupies of the overall particle size distribution, calculated as a percentage of the total volume of particles.

According to this invention, with particle size distribution is meant a volume distribution whereby the Vol % is measured in view of the particle size.

The values provided in this invention in relation to the Vol %, particle size and particle size distribution are measured through laser diffraction using a Malvern Mastersizer S laser diffraction apparatus (see the Examples section for further details on the experimental set-up and data processing). With this apparatus it is possible to provide several data which can be interpreted by plotting the cumulative volume percentage relative to the total particle volume (y-axis) versus the particle diameter (µm) (x-axis) or using a corresponding table. E.g. to measure the volume percentage of particles that are larger than 20 µm, first the volume percentage of particles with a diameter smaller than 20 µm relative to the total volume of all particles was determined by interpolation. The volume percentage of particles larger than 20 µm is 100 minus the interpolated volume percentage of particles smaller than 20 µm.

The average particle size of the polyurea compound is determined as the Volume Moment Mean diameter D[4,3] using the Malvern Mastersizer S laser diffraction apparatus.

The average number of urea bonds in non-crosslinked polyurea compound a2) is calculated using the following Eq I, assuming a reaction between one mole of polyisocyanate and a mixture of mono-amine and diamine with a molar ratio of isocyanate groups/total amine groups of 1 and 100% conversion.

$$\text{average number of urea bonds in polyurea compound } a2) = (\text{average functionality of polyisocyanate})/(1-\text{mole diamine}), \quad \text{Eq I:}$$

with the proviso that the amount of mole diamine is strictly less than 1 (i.e. the amount of mole diamine cannot be equal to 1).

For example, if polyurea compound a2) is prepared from one mole of 1,6-hexamethylene diisocyanate with average functionality of 2 and 2 moles of benzyl amine, the average number of urea bonds in polyurea compound a2) is calculated as 2/(1−0)=2. If polyurea compound a2) is prepared from one mole of isocyanurate compound with average functionality of 3, 0.5 moles of diamine and 2 moles of mono-amine, the average number of urea bonds in polyurea compound a2) is calculated as 3/(1−0.5)=6.

The average number of urea bonds in polyurea compound a2) is at least 2 and at most 6 per molecule, preferably at least 2 and at most 4.5, more preferably at least 2 and at most 4, even more preferably at least 2 and at most 3.9, and most preferably at least 3 and at most 3.9.

In a particular preferred embodiment, the relative particle size distribution width, is smaller than 10, preferably between 1 and 10, more preferably between 1.1 and 10, even more preferably between 2 and 8, most preferably between 2 and 6. It has been found that when the particle size distribution width is smaller than 10 the coating made from a crosslinkable composition comprising this polyurea compound a2) has reduced gloss with a gloss measurement below 45 gloss units at a 60° angle (as determined using a BYK Haze-gloss meter) when applied at a Dry Film Thickness (DFT) of between 50 and 60 µm (as measured using a Fischer Permascope MP40E-S).

The relative particle size distribution width according to this invention is defined as the ratio of the particle size at 90 vol % of the particle size distribution and the particle size at 10 vol % of the particle size distribution. The relative particle size distribution width is calculated according to the following Eq II.

relative particle size distribution width=[(particle size at 90 vol % of the particle size distribution)/(particle size at 10 vol % of the particle size distribution)]    Eq II:

An example of a particle size distribution curve is given in FIG. 1. FIG. 1 is a representation of a particle size distribution showing the Vol % of particles of a particulate polyurea compound in view of the particle size. The curve shows the particle size at 10 Vol % and 90 Vol %. The particle size distribution width can be measured by dividing the particle size at 90 Vol % and 10 Vol %.

An example for the measurement of the relative particle size distribution width is in case 90 vol % of the particles have a particle size of 50 µm or smaller and 10 vol % of the particles in the particle size distribution have a particle size of 8 µm or smaller, then the relative particle size distribution width is 50/8=6.25 (see Eq II).

In one embodiment, the polyurea compound a2) is formed from the reaction of a polyisocyanate or its isocyanurate, biuret, or uretdione derivative, or other (condensed) derivatives (of polyisocyanate), with at least one amine, which is preferably a mono-amine. In another embodiment the polyurea compound a2) is formed by the reaction of a monoisocyanate (including diisocyanates that have been selectively reacted at one side) with polyamines.

The use of the prefix "poly" for polyisocyanates and polyamines indicates that at least two of the mentioned functionalities are present in the respective polyfunctional compound.

Polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones, or other (condensed) derivatives) and substituted or unsubstituted aralkylene and cyclohexylene polyisocyanates. Optionally, the polyisocyanate may contain other functional groups such as for example ether functionalities, ester functionalities or urethane functionalities.

The polyisocyanate usually contains 2 to 40 and preferably 4 to 15 carbon atoms between the NCO groups. The polyisocyanate preferably contains on average 2 to 5 isocyanate groups, more preferably on average 2 to 3.9 isocyanate groups. It is even more preferred to use a symmetrical aliphatic or cyclohexylene diisocyanate or the derived isocyanurates.

Suitable examples of diisocyanates are preferably selected from the non-limiting group consisting of tetramethylene-1,4-diisocyanate, pentamethylene-1,5-diisocyanate, hexamethylene-1,6-diisocyanate (HMDI), octamethylene-1,8-diisocyanate, dodecamethylene-1,12-diisocyanate, 2,2,4-trimethylhexane-1,6-diisocyanate, trans-cyclohexylene-1,4-diisocyanate, 1,3-bis(isocyanatomethyl)cyclohexane, dicyclohexylmethane-4,4'-diisocyanate, 5-Isocyanato-1-(isocyanatomethyl)-1,3,3-trimethylcyclohexane (isophorone diisocyanate, IPDI), 1,5-dimethyl-(2,4-[omega]-diisocyanato methyl)benzene, 1,5-dimethyl(2,4-[omega]-diisocyanatoethyl)benzene, 1,3,5-trimethyl(2,4-[omega]-diisocyanato-methyl)benzene, 1,3,5-triethyl(2,4-[omega]-diisocyanatomethyl)benzene, 1,5-naphthalene diisocyanate, 1,3-phenylene diisocyanate, 1,4-phenylene diisocyanate, meta-xylylene diisocyanate, para-xylylene diisocyanate, dicyclohexyl-dimethylmethane-4,4'-diisocyanate, 2,4-toluene diisocyanate, 2,6-toluene diisocyanate and diphenylmethane-4,4'-diisocyanate (MDI).

Further suitable polyisocyanates are preferably selected from the group consisting of polyisocyanates based on HMDI, including (condensed) derivatives of HMDI, such as uretdiones, biurets, isocyanurates (trimers), and asymmetrical trimers, etc., many of which are marketed as DESMODUR® N and TOLONATE® HDB and TOLONATE® HDT. Other non-limiting examples of (condensed) derivatives of diisocyanates can be based on methylene diisocyanate, trimethylene diisocyanate, tetramethylene diisocyanate, 1,5-diisocyanatepentane, isophorone diisocyanate, ω,ω'-dipropylether diisocyanate, thiodipropyl diisocyanate, cyclohexyl-1,4-diisocyanate, dicyclohexylmethane-4,4'-diisocyanate, 1,5-dimethyl-2,4-bis-(isocyanatomethyl)-benzene, 1,3,5-trimethyl-2,4-bis-(isocyanatomethyl)benzene, 1,3,5-triethyl-2,4-bis-(isocyanatomethyl)benzene, dicyclohexyldimethylmethane-4,4'-diisocyanate, 2,4-toluene diisocyanate, 2,6-toluene diisocyanate and diphenylmethane-4,4'-diisocyanate.

Mixtures of the isocyanate-functional compounds mentioned above are also applicable.

Particularly preferred polyisocyanates are selected from the group consisting of HMDI and its (condensed) derivatives such as its isocyanurate trimer or its biuret, trans-cyclohexylene-1,4-diisocyanate, para- and meta-xylylene diisocyanate, and toluene diisocyanate, and mixtures thereof.

The most preferred polyisocyanates are HMDI or its (condensed) derivatives such as the isocyanurate derivatives.

As will be understood by the person skilled in the art, it is also possible to use conventionally blocked polyisocyanates which generate two or more isocyanates in situ, as long as the blocking agent, after splitting, does not prevent the formation of the particulate polyurea compound a2). Throughout this document the term "polyisocyanate" is used to denominate all polyisocyanates and polyisocyanate-generating compounds.

In accordance with a preferred embodiment of the invention the amines used to prepare the polyurea compound a2) comprise mono-amines.

The amines generally contain not more than 55 carbon atoms, preferably 1-24 and more preferably 1-12 carbon atoms. Many mono-amines can be used in combination with the polyisocyanates to create polyurea reaction products. Aliphatic as well as aromatic amines can be used, and primary as well as secondary amines.

Preferably, primary amines are used; of these n-alkylamines and ether-substituted n-alkylamines are particularly useful in accordance with this invention. Optionally, the amines may comprise other functional groups, such as hydroxy groups, ester groups, urethane groups. Preferred mono-amines include aliphatic amines, especially alkylamines such as ethylamine, n-propylamine, sec. propylamine, n-butylamine, sec. butylamine, tert. butylamine, n-pentylamine, α-methylbutylamine, α-ethylpropylamine, ethylbutylamine, hexylamine, octylamine, decylamine, dodecylamine, octadecylamine, stearylamine, cyclohexylamine, benzylamine, S-alpha-methylbenzylamine, 2-phenethylamine, ethanolamine, 6-aminohexanol, 2-methoxyethylamine, 2-ethoxyethylamine, 3-methoxy-1-propylamine, 1-methoxymethylpropylamine, 1,1-dimethoxy-2 propylamine, 3-ethoxy-1-propylamine, 3-butoxy-1-propylamine, 3-(2-ethylhexyloxy)-1-propylamine, 3-tridecyloxypropylamine, 3-stearyloxypropylamine, p-methoxybenzylamine, 3,4-dimethoxybenzylamine, p-methoxyphenylethylamine, 3,4-dimethoxyphenyl-ethyl-amine, 9-phenoxy-4,7-dioxanon-1-amine, furfurylamine, tetrahydrofurfurylamine, 2-(4-morpholinyl)ethylamine, 4-(3-aminopropyl)morpholine and 2,2'-aminoethoxyethanol as well as mixtures thereof.

Particularly preferred are mono-amines that are primary amines, preferably an n-aliphatic amine, more preferably an n-alkylamine such as hexylamine, cyclohexylamine, benzylamine, 3-methoxypropylamine, S-alpha-methylbenzylamine, 2-phenethylamine, or mixtures thereof.

The use of diamines as component next to mono-amines may also be an option. Diamines suitable for use include ethylene diamine, 1,3-diaminopropane, 1,4-diaminobutane, 1,6-diaminehexane, isophorone diamine, 4,4-diaminodicyclohexylmethane, diphenylmethane-4,4'-diamine, 4,7-dioxadecane-1,10-diamine, 4,9-dioxadecane-1,12-diamine, 7-methyl-4,10-dioxatridecane-1,13-diamine, 4,7,10-trioxatridecane-1,13-diamine, dideoxy-diamino isoidide and dideoxy-diamino isosorbide. In the embodiment where polyurea compound a2) is formed from a polyisocyanate and a mixture of mono-amines and diamines, the molar ratio of amine groups originating from di-amine/amine groups originating from mono-amine preferably is 0.8 or less, more preferably less than 0.5, most preferably less than 0.3.

Mixtures of the amines referred to above are also applicable.

The mono-amine or part of the mono-amine used to prepare the polyurea compound a2) can be a chiral mono-amine and polyurea compounds as described in U.S. Pat. No. 8,207,268 are considered to be part of this invention.

Specifically preferred polyurea compounds a2) are the adducts of (derivatives of) HMDI and benzylamine or S-alpha-methylbenzylamine or mixtures thereof, and the adducts of (derivatives of) HMDI and 3-methoxy-1-propylamine.

The relative molar ratio amine/isocyanate is usually between 0.7 and 1.3, preferably between 0.9 and 1.1, and more preferably between 0.95 and 1.05.

The particulate polyurea compound a2) of the invention comprises an average number of at least two and at most six urea bonds per molecule. Preferably, the average number of urea linkages (or urea bonds) in the polyurea molecule is between 2 and 4.5 per molecule, more preferably between two and four, even more preferably between 2 and 3.9, and most preferably between 3 and 3.9 (more specifically, the average number of urea linkages in the polyurea molecule is at least 2 and at most 4.5 per molecule, preferably at least 2 and at most 4, more preferably at least 2 and at most 3.9, and most preferably at least 3 and at most 3.9). In this way, it is possible to control the average particle size (of the particulate polyurea compound a2)). In case the (average) particle size would be too high, lump defects can become visible in the applied coating.

To obtain a particulate polyurea compound a2) having a volume percentage of equal or less than 40%, preferably less than 30%, more preferably less than 25% having a diameter of smaller than 10 μm, and having a volume percentage of equal or more than 11%, preferably more than 15%, more preferably more than 25%, and most preferably more than 40% having a diameter that is larger than 20 μm, the polyurea compounds are prepared by any convenient manner, generally with the reactants being stirred or agitated, in a batch or in a continuous process. The rotating speed of the stirrer is preferably such that the tip speed of the stirrer extremity is between 1 and 30 m/s, preferably between 1 and 20 m/s, more preferably between 1 and 10 m/s. The preparation of the polyurea compound a2) is preferably carried out at a temperature between 0 and 120° C., preferably between 10 and 80° C., more preferable between 10 and 60° C. A person skilled in the art knows that the process conditions may vary depending on the vessel that is used to prepare the polyurea and will understand how to change the parameters to obtain the specific volume percentage having a specific diameter range.

It is also possible that small amounts of co-reactive components are intentionally employed in the preparation reaction of the polyurea compound a2) to act as crystallization modifiers, and more particularly to modify the crystal sizes upon precipitation or the colloidal stability of the resulting crystals. Equally, dispersant and other adjuvants may be present in any of these introduction steps.

To prepare the particulate polyurea compound a2), amine components may be added to isocyanate or isocyanate may be added to amine components, whichever is most convenient. A person skilled in the art is able to adapt the process conditions (more particularly the addition and/or mixing sequence) to control the obtained particle size distribution and average particle size of the polyurea compound.

The polyurea formation reaction may be carried out in the presence of an inert solvent, for example acetone, methyl isobutyl ketone, N-methyl pyrrolidone, benzene, toluene, xylene, butyl acetate, an aliphatic hydrocarbon such as petroleum ether, alcohols, water, or mixtures thereof, or in the presence of a film forming resin a1) (see also below), for the final composition or any other coating formulation component. Here the term "inert" indicates that the solvent and/or film forming resin a1) does not significantly interfere in the process of polyurea formation, which means that the amount of polyurea formed when solvent is present is at least 80% of the amount produced when no solvent and/or resin is present.

Resin Composition A

As described, the second aspect of the invention is related to a resin composition A comprising
 a film forming resin a1) comprising
  at least two functional groups, each functional group having a functionality of at least 1, and/or
  at least one functional group having a functionality of at least 2;
 a particulate polyurea compound a2) of the invention as described above;
 optionally, a dispersing agent a3); and
 optionally, one or more of a compound a4) different from a1), a2) and a3).

According to this invention, with a film forming resin is understood a compound that is able to react with another or the same film forming resin or with a crosslinker if present, optionally in the presence of a catalyst, and forms a coating (also called film). The film forming resin has at least two functional groups, each functional group having a functionality of at least 1, and/or has at least one functional group having a functionality of at least 2, so that it can crosslink on at least two sides with other compounds and a crosslinked coating can be formed.

According to a preferred embodiment of the invention, the particulate polyurea compound a2) is prepared in the presence of the film forming resin a1). This can be done by mixing a mixture of the film forming resin a1) and the isocyanate with the amine or by mixing the isocyanate with a mixture of the film forming resin a1) and the amine components, or by mixing two mixtures of film forming resin a1) with amine components and NCO-components (i.e. by mixing a mixture of film forming resin a1) and amine components with a mixture of film forming resin a1) and NCO-components), respectively; or by mixing the isocyanate and the amine with the film forming resin a1) simultaneously. The amine components and the isocyanate components can be any of the compounds as described above.

It will be obvious that if the film forming resin a1) is highly reactive with either the amines or the isocyanate, the film forming resin and that particular susceptible compound cannot be premixed. By the term "highly reactive" is meant here that more than 30% of the susceptible amine or isocyanate reacts with the film forming resin a1) before the amine and the isocyanate are mixed in order to prepare the polyurea compound a2).

In one embodiment, the concentration of the amine- and isocyanate functional components in the resin composition A, leading to the formation of the particulate polyurea delustering agent (or particulate polyurea compound) a2), is chosen such that a polyurea content is obtained of between 3 and 30 wt %, preferably between 4 and 20 wt %, more preferably between 5 and 15 wt % in view of the total weight of the film forming resin a1) and the polyurea compound a2) in accordance with Eq III (see further below).

According to another embodiment, the particulate polyurea delustering agent a2) is present at a content (in an amount of) between 3 and 30 wt %, preferably between 4 and 20 wt %, more preferably between 5 and 15 wt % in view of the total weight of the film forming resin a1) and the polyurea compound a2) in accordance with Eq III (see below).

Eq III is defined as a percentage by weight of polyurea a2) relative to total weight of film forming resin a1) and polyurea compound a2), i.e.

the weight % of the particulate polyurea compound a2)=[(weight of particulate polyurea compound a2))/((weight of film forming resin $a1$))+ (weight of particulate polyurea compound a2)))]*100%   Eq III (in wt %):

The amount of polyurea compound a2) in the total resin composition A (thus comprising a1), a2), and optionally a3) and a4)) is preferably at least 2.5% by weight, more preferably at least 4% by weight (relative to the total weight of the resin composition A, the sum of weight percentages (wt %) not exceeding 100%).

In another embodiment, the polyurea compound a2) is present between 2.5 and 20 wt %; the film forming resin a1) is present between 1% and 97.5 wt %, preferably between 5% and 97.5 wt %, more preferably between 15% and 97.5 wt %, even more preferably between 30 and 97.5 wt %; the dispersing agent a3) is present between 0 wt % and 10 wt %; and the one or more compound a4) is present between 0% and 96.5 wt %, preferably between 0% and 92.5 wt %, more preferably between 0% and 82.5 wt %, even more preferably between 0 wt % and 78 wt %, relative to the total weight of the resin composition A (wherein the sum of weight percentages (wt %) does not exceed 100%).

The amount of film forming resin a1) in the resin composition A according to the invention is usually from 1% to 97.5 wt %, preferably from 5% to 97.5 wt %, more preferably from 15% to 97.5 wt %, even more preferably from 30 to 97.5 wt %, even more preferably from 35 to 80 wt %, most preferable from 35 to 70 wt %, relative to the total resin composition A. The amount of film forming resin a1) is preferably at least 45 wt %, more preferably at least 50 wt %, relative to the total resin composition A.

The amount of dispersing agent a3) in the resin composition A is preferably between 0 and 10 wt %, more preferably between 0.1 and 8 wt %, most preferably between 0.2 and 7 wt %, relative to the total resin composition A.

Particularly preferred is a resin composition A comprising between 35 and 80 wt % of film forming resin a1), from 3 to 15 wt % of polyurea compound a2), from 0 to 7 wt % of dispersing agent a3), from 20 to 70 wt % of volatile organic compound (or organic solvent) a4)-1, and from 0 to 8 wt % of other compound (or additive) a4)-2 (wherein the sum of weight percentages (wt %) does not exceed 100%).

The resin composition A preferably comprises less than 10 wt % of water, more preferably less than 5 wt % of water, most preferably less than 1 wt % of water, or is even substantially free of water (i.e. not containing water, being a so-called non-aqueous composition).

In one embodiment, the polyurea compound a2) is prepared in situ, in the presence of the film forming resin a1).

It is also possible to prepare the polyurea compound a2) while preparing a crosslinkable composition (see further). This can be done by dissolving an amine-functional component as described above in any component of the crosslinkable composition, e.g. the film forming resin a1) and/or b) and/or in a crosslinker c) and mixing the resulting amine-containing solution with a separately dissolved polyisocyanate as described above in another or the same component of the crosslinkable composition. Alternatively, the polyurea compound a2) can be produced in situ by mixing an amine-functional species dissolved in any component of the crosslinkable composition, e.g. film forming resin a1) and/or b) with crosslinker c), whereby the crosslinker c) is a poly isocyanate as described below.

Film Forming Resins a1), a1') and b)

As discussed further, the crosslinkable compositions according to the invention may comprise a further film forming resin b) or a1') which is the same or different from the film forming resin a1). The film forming resins a1), a1') and b) are described below.

Film forming resin a1') is part of a resin composition A', wherein resin composition A' further comprises a particulate polyurea compound a2'); optionally, a dispersing agent a3'); and optionally one or more of a compound a4') different from a1'), a2') and a3'). In case film forming resin a1) is reactable with a film forming resin a1'), the resin composition A' can comprise the same or a different composition as resin composition A. Film forming resin a1) can be the same or different from film forming resin a1'). The film forming resin composition A' and its compounds a1'), a2'), a3') and a4') are those as described throughout the description for the film forming resin composition A and its compounds a1), a2), a3) and a4), respectively, mutatis mutandis. Thus in the description the features, embodiments and examples described herein for a1) are the same as for a1').

There are no limitations to the compositions of the backbone of film forming resin a1) and b). Preferably the film forming resin a1) or b) is selected from the group consisting of polyester resins, (meth)acrylic resins, polycarbonate resins, polyether resins, polyurethane resins, amino resins, and mixtures and hybrids thereof. Such polymers are generally known to the skilled person and are commercially available.

The film forming resin b) can be different or the same as film forming resin a1). The functional groups can be any functional group. Preferred functional groups are hydroxy, primary amine, secondary amine, mercaptane, activated unsaturated C=C moieties, carboxylic acid, epoxide, isocyanate, an activated methylene, or methine species such as (derivatives of) acetyl acetone, acetoacetate or malonate. More preferred functional groups are hydroxy, primary amine, secondary amine, mercaptane, activated unsaturated C=C moieties, carboxylic acid, epoxide, an activated methylene, or methine species such as (derivatives of) acetyl acetone, acetoacetate or malonate. Functional groups can also be blocked by a chemical reaction, such as for example a ketimine as a blocked version of a primary amine blocked by a ketone. A person skilled in the art is well aware of such chemical blockers. Film forming resins a1) or b) may comprise more than one type of functional groups. These different types of functional groups may be present in the same or in different molecules. The functional groups of a1) or b) can be reactable with other functional groups from a1) or b). It is also possible that the functional groups a1) and/or b) can be reactable with crosslinker c) if present.

Accordingly, the film forming resin a1) can be crosslinkable with another film forming resin a1') which can be the same or different from a1); the film forming resin a1) can be crosslinkable with film forming resin b) which can be the same or different form a1); and/or the film forming resin a1) and/or a1') can be crosslinkable with crosslinker c) if present, and/or the film forming resin b) can be crosslinkable with film forming resin c).

Of the wide variety of potentially suitable film forming resins a1) and b), preferred are the polyester resins, polyurethane resins and (meth)acrylic resins, amino resins, or mixtures or hybrids thereof.

The film forming resin a1) or b) used in the resin composition A according to the invention preferably has a weight averaged molecular weight Mw of less than 30,000 Dalton, more preferably less than 10,000 Dalton, most preferably less than 5,000 Dalton.

The number averaged molecular weight Mn of resin a1) or b) is preferably at most 10,000 Dalton, more preferably at most 5,000 Dalton, most preferably at most 3,000 Dalton.

The polydispersity of the molecular weight distribution of resin a1) or b), determined by dividing the weight averaged molecular weight Mw by the number averaged molecular weight Mn, is preferably between 1 and 10, more preferably between 1.5 and 6 and most preferably between 1.7 and 4.

The glass transition temperature Tg of film forming resin a1) or b) is preferably higher than $-80°$ C., more preferably higher than $-40°$ C., most preferably higher than $-30°$ C. The glass transition temperature of resin a1) does preferably not exceed 100° C., more preferably 90° C., most preferably 80° C.

The film forming resin a1) or b) has an equivalent weight in the range of 50 to 2500 grams of resin a1) or b) per mole of functional groups, preferably in the range of 80 to 400 grams of resin a1) or b) per mole of functional groups, and more preferably in the range of 100 to 300 grams of resin a1) or b) per mole of functional groups.

According to a first especially preferred embodiment of the film forming resin a1) or b), the resin a1) or b) is a polyol. The polyols a1) and b) comprise on average at least 2, preferably more than 2, —OH groups. Preferably polyols a1) and/or b) comprise on average at least 2.2 —OH groups, more preferably on average at least 2.5 —OH groups. Polyol b) can comprise the same polyol as polyol a1), and/or polyol b) can comprise a polyol which is different compared to the polyol a1).

The polyols a1) and b) are preferably selected from the group consisting of polyester polyols, (meth)acrylic polyols, polycarbonate polyols, polyether polyols, polyurethane polyols, and mixtures and hybrids thereof. Such polymers are generally known to the skilled person and are commercially available. The polyols a1) or b) are preferably selected from the group consisting of polyester polyols and (meth)acrylic polyols, as well as mixtures and hybrids thereof, as further described here under. Of the wide variety of potentially suitable polyols a1) and b), preferred are the polyester polyols, (meth)acrylic polyols, or hybrids or mixtures thereof.

Suitable polyester polyols can be obtained, for instance, by the polycondensation of one or more di- and/or higher functional hydroxy compounds with one or more di- and/or higher functional carboxylic acids, C1-C4 alkyl esters and/or anhydrides thereof, optionally in combination with one or more monofunctional carboxylic acids and/or C1-C4 alkylesters thereof and/or monofunctional hydroxy compounds. Non-limiting examples of monocarboxylic acids are linear or branched alkyl carboxylic acids comprising 4 to 30 carbon atom, such as stearic acid, 2-ethylhexanoic acid and isononanoic acid. As non-limiting examples, di- and/or higher functional hydroxy compounds can be one or more alcohols selected from the group consisting of ethylene glycol, neopentyl glycol, 1,3-propanediol, 1,4-butanediol, isosorbide, spiroglycol, trimethylol propane, glycerol, trihydroxyethyl isocyanurate and pentaerythritol. As non-limiting examples, the di- and/or higher functional carboxylic acids are one or more selected from the group consisting of succinic acid, adipic acid, sebacic acid, 1,4-cyclohexyl dicarboxylic acid, hexahydrophthalic acid, terephthalic acid, isophthalic acid, phthalic acid and functional equivalents thereof. Polyester polyols can be prepared from di and/or higher functional hydroxy compounds and from carboxylic acids, and/or anhydrides and/or C1-C4 alkyl esters of the acids.

Typical preferred acid values of the polyols is less than 15, preferably less than 10, most preferably less than 8 mg KOH/g. The acid value can be determined according to ISO 3682-1996.

Suitable (meth)acrylic polyols can be obtained, for instance, by the (co)polymerization of hydroxy-functional (meth)acrylic monomers with other ethylenically unsaturated comonomers in the presence of a free radical initiator. As a non-limiting example, the (meth)acrylic polyol can include residues formed from the polymerization of one or more hydroxyalkyl esters of (meth)acrylic acid, such as for example hydroxyethyl (meth)acrylate, hydroxypropyl (meth)acrylate, hydroxybutyl (meth)acrylate, polyethylene glycol esters of (meth)acrylic acid, polypropylene glycol esters of (meth)acrylic acid, and mixed polyethylene glycol and polypropylene glycol esters of (meth)acrylic acid. The (meth)acrylic polyol further preferably comprises monomers not containing hydroxyl groups such as methyl (meth)acrylate, tert-butyl (meth)acrylate, isobornyl (meth)acrylate, isobutyl (meth)acrylate, (substituted)cyclohexyl (meth)acrylate, (meth)acrylic acid. The (meth)acrylic polyol optionally comprises non-(meth)acrylate monomers such as styrene, vinyl toluene or other substituted styrene derivatives, vinyl esters of (branched) monocarboxylic acids, maleic acid, fumaric acid, itaconic acid, crotonic acid and monoalkylesters of maleic acid.

According to a second preferred embodiment, polyol a1) or b) comprises a mixture of more than one polyol a1) or b), in particular a mixture of at least one (meth)acrylic polyol a1) or b) and at least one polyester polyol a1) or b) as described for the preferred embodiments here above.

The polyol a1) or b) can be a so-called hybrid polyacrylate polyester polyol, wherein the (meth)acrylic polyol is prepared in situ in the polyester polyol. The (meth)acrylic polyol and polyester polyol are preferably obtained with the same monomers as described here above for the (meth)acrylic polyol and the polyester polyol.

According to a third especially preferred embodiment, the film forming resin a1) or b) comprises an amino resin, preferably a melamine-formaldehyde resin. Melamine-formaldehyde resins are very well known and have been commercialized since long, and may be obtained from allnex under the tradenames of CYMEL® and SETAMINE®. These melamine-amino resins, optionally in solution in corresponding organic solvents, comprise products with various degrees of methylolation, degrees of etherification or degrees of condensation (monocyclic or polycyclic).

According to a fourth especially preferred embodiment, the film forming resin a1) or b) comprises functionalities which are acidic protons (C—H) in activated methylene or methine groups. In this preferred embodiment, it is preferred that film forming resin a1) or b) is a malonate or acetoacetate, preferably dominantly a malonate or mixture thereof. It is preferred that the film forming resins a1) or b) are one or more polymers chosen from the group of polyesters, alkyds, polyurethanes, polyacrylates, epoxy resins, polyamides and polyvinyl resins which contain a malonate and/or acetoacetate moiety in the main chain, pendant, terminal or combinations thereof.

This specific fourth embodiment can typically react with a compound comprising functionalities which are activated unsaturated C═C moieties as described below in the presence of a catalyst d) which is a base. Such composition are known as a Real Michael Addition (RMA) crosslinkable compositions and are known in the art; WO11/124663, WO11/124664 and WO11/124665 describe RMA crosslinkable compositions with latent base catalyst comprising carbon dioxide blocked base catalyst which generates a strong base on carbon dioxide deblocking in the coating layer. WO14/166880 describes RMA crosslinkable compositions with a catalyst that does not rely on carbon dioxide deblocking, which is particularly suitable for layers where evaporation is hindered, for example for thicker layers. WO13/050622, WO13/050623, WO13/050624 and WO13/050574 describe RMA crosslinkable compositions with special pot-life and open time moderators. WO16/166361, WO16/166381, WO16/166382 and WO2018/005077 further describe RMA crosslinkable compositions. The description of the various embodiments of the RMA crosslinkable compositions in these prior art documents is herewith enclosed by reference. In particular reference is made to the above identified prior art concerning detailed description of all components in the RMA crosslinkable composition, their preparation, the amounts used in the RMA crosslinkable composition as well as for measurement methods and definitions and the description thereof is hereby incorporated by reference and applicable unless described otherwise herein.

According to a fifth especially preferred embodiment, the film forming resin a1) or b) comprises functionalities which are activated unsaturated C═C moieties. According to this fifth preferred embodiment the film forming resin a1) or b) is a (meth)acryloyl compound, preferably an acryloyl compound. Suitable film forming resins having ethylenically unsaturated functional groups, in which the carbon-carbon double bond is activated by an electron-withdrawing group, e.g. a carbonyl group in the alpha-position, are disclosed in U.S. Pat. No. 2,759,913 (column 6, line 35 through column 7, line 45), DE-PS-835809 (column 3, lines 16-41), U.S. Pat. No. 4,871,822 (column 2, line 14 through column 4, line 14), U.S. Pat. No. 4,602,061 (column 3, line 14 through column 4, line 14), U.S. Pat. No. 4,408,018 (column 2, lines 19-68) and U.S. Pat. No. 4,217,396 (column 1, line 60 through column 2, line 64).

The film forming resin a1) or b) according to this fifth preferred embodiment are preferably acrylates, fumarates and maleates. Most preferably, such a film forming resin a1) or b) is an unsaturated acryloyl functional component. Said components having activated unsaturated C═C moieties can be selected from a first preferred group of acrylic esters of components containing 2-6 hydroxyl groups and 1-30 carbon atoms. These esters may optionally contain hydroxyl groups. Especially preferred examples include trimethylolpropane triacrylate, pentaerythritol triacrylate and di-trimethylolpropane tetraacrylate. Other suitable compounds may be selected from the group of resins such as polyesters, polyurethanes, polyethers, epoxy resins, and/or alkyd resins containing pendant activated unsaturated groups. Preferably, other suitable compounds may be selected from the group of resins such as polyesters, polyurethanes, polyethers, and/or alkyd resins containing pendant activated unsaturated groups. These include, for example, urethane acrylates obtained by reaction of a polyisocyanate with an hydroxyl group-containing acrylic ester, e.g., an hydroxyalkyl ester of acrylic acid or a component prepared by esterification of a polyhydroxyl component with less than a stoichiometric amount of acrylic acid; polyether acrylates obtained by esterification of an hydroxyl group-containing polyether with acrylic acid; polyfunctional acrylates obtained by reaction of an hydroxyalkyl acrylate with a polycarboxylic acid and/or a polyamino resin; polyacrylates obtained by reaction of acrylic acid with an epoxy resin; and polyalkylmaleates obtained by reaction of a monoalkylmaleate ester with an epoxy resin and/or an hydroxy functional oligomer or polymer. Such compounds are very well known and have been commercialized since long, and may be obtained from allnex under the tradename of EBECRYL®. Apart from acryloyl esters a class of suitable components are acrylamides. In addition to the previously described film forming resins a1) or b) having (at least) two functional groups, each functional group having a functionality of at least 1, it is also possible to use film forming resins a1) or b) having at least one functional group having a functionality of at least 2. For example, ethylenically unsaturated comonomers can be used in this fifth preferred embodiment, such as esters of (meth)acrylic acid, such as for example hydroxyethyl (meth)acrylate, hydroxypropyl (meth)acrylate, hydroxybutyl (meth)acrylate, polyethylene glycol esters of (meth)acrylic acid, polypropylene glycol esters of (meth)acrylic acid, and mixed polyethylene glycol and polypropylene glycol esters of (meth)acrylic acid, methyl (meth)acrylate, tert-butyl (meth)acrylate, isobornyl (meth)acrylate, isobutyl (meth)acrylate, (substituted)cyclohexyl (meth)acrylate, (meth)acrylic acid. Also non-(meth)acrylate ethylenically unsaturated comonomers such as styrene, vinyl toluene or other substituted styrene derivatives, vinyl esters of (branched)

monocarboxylic acids, maleic acid, fumaric acid, itaconic acid, crotonic acid and monoalkylesters of maleic acid can be used.

Optional Dispersing Agents a3)

The resin composition A optionally also comprises a dispersing agent a3). Dispersing agents are generally known in the art and are commercially available. Dispersing agent a3) can be any type of dispersing agent known in the art.

In one embodiment the dispersing agent a3) is present and is selected from the group consisting of polyesters, polyurethanes, and polyacrylates with pigment-affinic anionic, cationic or nonionic groups, and high molecular weight block copolymers with basic pigment affinic groups. Combinations of dispersants may also be used.

Compounds suitable for use as dispersing agent a3) can for example be selected from the group of polyurethane dispersants exhibiting an essentially linear backbone with laterally attached side-chains of solvent solubilizing polyester, polyacrylic, polyether or polyolefin side chains including mixtures of such side chains. Such polyurethane dispersants can optionally be functionalized with reactive carbon to carbon double bonds. Polyurethane dispersants can also be obtained by reacting a polyisocyanate with e.g. (cyclic) amine groups, polyesters and/or polyethers. Polyesters obtainable by reacting a fatty acid with either a hydroxy-C4-5-alkylene carboxylic acid, or a lactone can also be used as dispersants. Another class of suitable dispersants include polyester amine dispersants, which can be derived from an amine-functional species to which is attached a polyester chain. The polyester chain may be derived from 12-hydroxy stearic acid, or it may be derived from two or more different hydroxy carboxylic acids. Such polyester amine dispersants may be obtained by reaction of a polyester from hydroxy-carboxylic acid with diamines. Said dispersing resins can also include one or several polyether chains. Alternatively, such polyester amine dispersants consists of polyethylene imine (PEI)-based compounds characterized by a "grafting from" approach, allowing the manufacture of solvent based dispersant systems. The polyethylene imine (PEI)-based pigment dispersant can be presented by the formula X-(T)m-P-(T)n-H wherein P is a polyethyleneimine (PEI) backbone; T is a residue —CO—A—O— wherein A is C2-C12 alkylene optionally substituted with C1-C6 alkyl with the proviso that each linkage between P and T is an amide bond and each linkage between X and T is an ester bond, X is a modifier or terminator residue R—CO— wherein R is a linear or branched, saturated or unsaturated alkanecarboxylic acids having from 1 to 22 carbon atoms or an unsaturated fatty acid residue or a hydroxycarboxylic residue or a polyester residue obtained from polycondensation of hydroxycarboxylic acids, or an acid terminated polyether, n, m independently are a number from 1 to 100. Dendritic molecules can also be applied as dispersing agents, said dendrimers comprising functional groups that have reacted with a functional moiety, said moiety being defined as R—X, X being a pigment-affinic group, and R being a linking moiety chain having at least 2 atoms in the chain, with the proviso that the functional group and the pigment-affinic group are different.

Suitable dispersants are available from, among others, allnex, Altana and Evonik and include, but are not limited to, polyesters, polyurethanes or polyacrylates with pigment-affinic anionic, cationic or nonionic groups, or high molecular weight block copolymers with basic pigment affinic groups, or combinations thereof. Suitable examples are ADDITOL® XL 6577, ADDITOL® VXW 6208/60 ADDITOL® XL 6521, ADDITOL® VXW 6208/60, DISPERBYK® 2150.

It has been found that the addition of dispersing agents to the resin composition A according to the invention can provide a decreased viscosity. This can be beneficial for obtaining low VOC paints. The low viscosity can also help to obtain good levelling and appearance e.g. when used in spray applications.

Optionally One or More of a Compound a4) Different from a1), a2) and a3)

The resin composition A according to the invention may optionally comprise one or more other compounds a4), that are different from a1), a2) and a3).

In one embodiment, the one or more other compound a4) is an organic solvent (further denoted as a4)-1 and/or an additive (further denoted as a4)-2).

The organic compound can be e.g. volatile organic compounds. In general, these are compounds with a boiling point at atmospheric pressure of 190° C. or less. Preferably, the amount of volatile organic compound a4)-1 relative to the total resin composition A is less than 60%, more preferably less than 50%, most preferably less than 40%. In some embodiments, the amount of volatile organic solvent a4)-1 relative to the total mass of the resin composition A may be less than 30% or even less than 20%.

Examples of suitable volatile organic compounds a4)-1 are hydrocarbons or mixtures thereof, such as toluene, xylene, Solvesso 100, Solvesso 150, ketones, terpenes, such as dipentene or pine oil; halogenated hydrocarbons, such as dichloromethane; ethers, such as ethylene glycol dimethyl ether, dipropylene glycol methyl ether; esters, such as ethyl acetate, ethyl propionate, n-propyl acetate, n-butyl acetate, hexyl acetate; ether esters, such as methoxypropyl acetate, butyl glycol acetate and ethoxyethyl propionate; alcohols, such as n-propanol, isopropanol, n-butanol, methoxypropanol and 2-ethylhexanol. Also mixtures of these compounds can be used.

In another embodiment, the resin composition A further comprises a compound a4)-2, being different from a1), a2), a3) and a4)-1, and which is an additive. Additives also encompass auxiliaries commonly used in coating compositions. The additives a4)-2 are commonly used in smaller amounts to improve certain important paint properties. These additives a4)-2 may comprise a volatile part comprising a solvent with a boiling point at atmospheric pressure of 190° C. or less and a non-volatile part. Examples of such additives are surfactants, levelling agents, wetting agents, anti-cratering agents, antifoaming agents, heat stabilizers, light stabilizers, UV absorbers, antioxidants and reactivity moderators e) as described below.

The amount of such compounds a4)-2 is usually from 0 to 10 wt %, preferably from 1 to 8 wt %, and most preferably from 2 to 7 wt % relative to the total weight of film forming resin a1), polyurea compound a2), and, if present, dispersing agent a3), volatile organic compound a4)-1 and compounds a4)-2.

The Crosslinkable Compositions

As described, the third aspect of the current invention is related to a crosslinkable composition comprising the resin composition A as described above. The crosslinkable composition further comprises a film forming resin b) and/or a film forming resin a1'), and optionally a crosslinker c). The film forming resin a1), a1'), and b), and crosslinker c) if present, comprises at least two functional groups, each functional group having a functionality of at least 1, and/or at least one functional group having a functionality of at least 2. Film forming resin a1) and/or film forming resin b) is reactable with film forming resin b) and/or film forming resin a1') and/or crosslinker c) if present. The film forming resin a1') and film forming resin b) are different from or the same as film forming resin a1). Accordingly, the film forming resin a1) can be reactable with crosslinker c) if present, and/or with film forming resin b) and/or with film forming resin a1'). It is also possible that film forming resin b) reacts with crosslinker c) if present, and/or with film forming resin a1') and/or with film forming resin b). Also film forming resin a1') is reactable with crosslinker c) if present, and/or with film forming resin b) and/or with film forming resin a1').

The crosslinkable composition according to the invention may optionally further comprise a catalyst d) for catalyzing the reaction of the functional groups of film forming resin a1) and/or film forming resin b) with crosslinker c) if present and/or with film forming resin b) and/or with film forming resin a1'); optionally a reactivity moderator e); optionally a volatile organic compound f); optionally a reactive diluent g), optionally another resin h), and optionally other delustering compositions i) that are different from or the same as particulate polyurea compound a2). Preferably, reactive diluent g) is different from film forming resin b). Preferably, delustering composition i) is different from particulate polyurea compound a2).

The crosslinkable composition has preferably a solids content of at least 20 wt %, preferably higher than 30 wt %, more preferably higher than 40 wt %, even more preferably higher than 50 wt %, based on the total weight of the composition.

In one embodiment, the particulate polyurea compound a2) is present in the film forming resin A, in an amount such that when used in a crosslinkable composition the amount of the particulate polyurea compound a2) in the crosslinkable composition is between 0.5 and 25 wt %, preferably between 4 and 20 wt %, more preferably between 4 and 15 wt % relative to the total amount of film forming resin a1), particulate polyurea compound a2), and if present, dispersing agent a3), non-volatile part of additive a4)-2, crosslinker c), film forming resin b), film forming resin a1'), catalyst d), reactivity moderator e), reactive diluent g), other resin h), and delustering composition i), in the crosslinkable composition, in accordance with following Eq IV.

weight % of the particulate polyurea compound $a2$) in view of the crosslinkable composition=
[(weight of particulate polyurea compound $a2$))/
(weight of film forming resin $a1$)+weight of particulate polyurea compound $a2$)+weight of dispersing agent $a3$)+non-volatile part of additive $a4$)-2+weight of crosslinker $c$)+weight of film forming resin $b$)+weight of film forming resin $a1'$)+weight of catalyst $d$)+weight of reactivity moderator $e$)+weight of reactive diluent $g$)+weight of other resin $h$)+weight of delustering composition $i$))]*100%    Eq IV (in wt %):

In this Eq IV, the wt % of the volatile organic compounds f) and a4)-1, and volatile part of additive a4)-2, if present, is not taken into account.

The amount of resin composition A used in the crosslinkable composition is usually from 5 to 99%, preferably from 5 to 80, and most preferably from 10 to 75, % by weight of the total crosslinkable composition.

The non-volatile content of the crosslinkable composition according to the invention at application viscosity, usually referred to as the solid content, is preferably at least 20 wt % based on the total crosslinkable composition, more preferably higher than 30 wt % and most preferably higher than 35 wt %. Here, the solid content is calculated by following Eq V.

solid content[in wt %]={[weight of film forming resin $a1$)+weight of polyurea compound $a2$)+weight of dispersing agent $a3$)+weight of non-volatile part of additive $a4$)-2+weight of film forming resin $b$)+weight of crosslinker $c$)+weight of film forming resin $a1'$)+weight of catalyst $d$)+weight of reactivity moderator $e$)+weight of reactive diluent $g$)+weight of binder $h$)+weight of delustering agent $i$) other than $a2$)+weight of non-volatile parts of (other) additives)]/[total weight of the crosslinkable composition at application viscosity−weight of pigments−weight of fillers]}*100    Eq V:

The crosslinkable composition according to the invention preferably comprises
 from 0.5 to 25 wt %, preferably from 4 to 20 wt %, more preferably from 4 to 15 wt % of particulate polyurea compound a2),
 from 0.5 to 99 wt %, preferably from 5 to 99 wt %, more preferably from 10 to 95 wt %, even more preferably from 20 to 90 wt % of film forming resin a1) plus film forming resin b) plus film forming resin a1') (or from 0.5 to 99 wt %, preferably from 5 to 99 wt %, more preferably from 10 to 95 wt %, even more preferably from 20 to 90 wt % of film forming resins a1)+b)+a1')),
 from 0 to 20 wt %, preferably from 0.1 to 15 wt %, more preferably from 0.2 to 10 wt % of dispersing agent a3),
 from 0 to 95 wt %, preferably from 10 to 80 wt %, more preferably from 15 to 50 wt % of crosslinker c),
 from 0 to 10 wt %, preferably from 0.001 to 5 wt %, more preferably from 0.005 to 2 wt % of catalyst d),
 from 0 to 15 wt %, preferably from 0.1 to 10 wt %, more preferably from 0.2 to 7 wt % of reactivity moderator e),
 from 0 to 70 wt %, preferably from 0 to 50 wt %, more preferably from 0 to 20 wt % of reactive diluent g),
 from 0 to 50 wt %, preferably from 0 to 30 wt %, more preferably from 0 to 20 wt % of another resin h),
 from 0 to 25 wt %, preferably from 0 to 15 wt %, more preferably from 0 to 10 wt % of another delustering composition i) different from or the same as particulate polyurea compound a2),
 relative to the total solid crosslinkable composition comprising film forming resin a1), polyurea compound a2), optional film forming resin a1'), optional dispersing agent a3), other optional non-volatile compounds a4)-2 different from a1), a1'), a2), and a3), optional film forming resin b), optional crosslinker c), optional catalyst d), optional reactivity moderator e), optional reactive diluent g), optional other binder h), and optional delustering composition i) (wherein the sum of weight percentages (wt %) does not exceed 100%). Preferably, reactive diluent g) is different from film forming resin b). Preferably, delustering composition i) is different from particulate polyurea compound a2).

The crosslinkable composition preferably comprises from 25 to 100 wt % of a total amount of resin composition A, and if present, film forming resin b), crosslinker c), catalyst d), and reactivity moderator e), based on the total amount of the coating composition.

The crosslinkable composition preferably comprises a total amount of volatile organic compound f) and volatile organic compound a4)-1 from 0 to 80 wt %, more preferably from 0 to 70 wt %, even more preferably from 0 to 60 wt %, most preferably from 0 to 50 wt %, relative to the total weight of the crosslinkable composition.

The crosslinkable composition of the invention provides coatings with reduced gloss, reduced gloss coating having a gloss measurement of of at most 45 gloss units, preferably at most 30 gloss units, more preferably at most 20 gloss units at a 60° angle (as determined using a BYK Haze-gloss meter) when applied at a Dry Film Thickness (DFT) of between 50 and 60 μm (as measured using a Fischer Permascope MP40E-S), improved durability and scratch resistance, good transparency and provides well-balanced other relevant coatings properties such as hardness, chemical resistance, flexibility and durability.

Crosslinker c)

The film forming resin a1), a1') and/or b) is optionally reactable with a crosslinker c) (or otherwise stated, film forming resin a1), a1') and/or b) can be reactable with a crosslinker c) if present in the crosslinkable composition described above).

Crosslinker c) comprises an oligomeric or polymeric compound with at least two functional groups, each functional group having a functionality of at least 1, and/or at least one functional group having a functionality of at least 2, the functional group(s) being reactable with film forming resin a1), a1') and/or b). There are no limitations to the type of crosslinker c), and as the skilled person will know, the functional groups in crosslinker c) will highly depend on the functional groups present in film forming resin a1), a1') and/or b).

In one embodiment, the functional groups of crosslinker c) are preferably selected from the group consisting of isocyanate, hydroxy, primary amine, secondary amine, mercaptane, activated unsaturated C=C moieties, carboxylic acid, epoxide, an activated methylene, methine species such as (derivatives of) acetyl acetone, acetoacetate or malonate, and mixtures thereof. The functional groups can also be blocked by a chemical reaction. A person skilled in the art is well aware of such chemical blockers. There are no limitations to the compositions of the backbone of crosslinker c). Preferably the crosslinker c) is selected from the group consisting of (condensed) derivatives of diisocyanates, such as uretdiones, biurets, isocyanurates (trimers), and asymmetrical trimers, polyester resins, (meth)acrylic resins, polycarbonate resins, polyether resins, polyurethane resins, amino resins, and mixtures and hybrids thereof. Such crosslinkers are generally known to the skilled person and are commercially available.

Preferably, the relative amounts of the functional groups present in film forming resin a1) and/or b), reactable with crosslinker c) and the functional groups in crosslinker c) are chosen such that the molar ratio of functional groups in crosslinker c)/total functional groups in film forming resin a1), a1') and b) is between 0.5 and 3 and preferably between 0.75 and 2 or 0.8 and 1.8.

Crosslinker component c) can comprise amino resins such as melamine-formaldehyde resins which are very well known and have been commercialized since long, and may be obtained from allnex under the tradenames of CYMEL® and SETAMINE®. These melamine-formaldehyde resins, optionally in solution in corresponding organic solvents, comprise products with various degrees of methylolation, degrees of etherification or degrees of condensation (monocyclic or polycyclic).

Crosslinker component c) can also preferably comprise an isocyanate compound with at least two free —NCO (isocyanate) groups. Isocyanate crosslinkers are well known and have extensively been described in the art. The isocyanate compound is usually selected from the group consisting of aliphatic, cycloaliphatic, and/or aromatic polyisocyanates comprising at least two —NCO groups and mixtures thereof. The crosslinker c) is then preferably selected from the group consisting of hexamethylene diisocyanate, 2,4,4-trimethyl hexamethylene diisocyanate, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis(isocyanate methyl)benzene, xylylene diisocyanate, α,α,α',α'-tetramethyl xylylene diisocyanate (TMXDI), 1,5-dimethyl-2,4-bis(isocyanate methyl)benzene, 2,4- and 2,6-toluene diisocyanate, 2,4,6-toluene triisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates. Other preferred isocyanate crosslinkers are (the condensed) derivatives of diisocyanates, such as biurets, isocyanurates, imino-oxadiazinediones, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (e.g. available under the trade names DESMODUR® (E) N3390, TOLONATE® HDT-LV, TOLONATE® HDT-90 or DESMODUR® ultra 2822), the biuret of hexamethylene diisocyanate, under the trade name DESMODUR® N 75, a mixture of the uretdione and the isocyanurate of hexamethylene diisocyanate, under the trade name DESMODUR® N3400, the allophanate of hexamethylene diisocyanate, available under the trade name DESMODUR® LS 2101, and the isocyanurate of isophorone diisocyanate, available under the trade name VESTANAT® T1890. Furthermore, (co)polymers of isocyanate-functional monomers such as α,α'-dimethyl-m-isopropenyl benzyl isocyanate are suitable for use. If desired, it is also possible to use hydrophobically or hydrophilically modified polyisocyanates to impart specific properties to the coating.

Crosslinker component c) can also comprise blocked isocyanates when blocking agents having a sufficiently low deblocking temperature they can be used to block any of the polyisocyanate crosslinker component c) mentioned above. In that case, crosslinker component c) is substantially free of unblocked isocyanate group-containing compounds and the crosslinkable composition can be formulated as one-component formulation. The blocking agents which can be used to prepare a blocked isocyanate component are well-known to the skilled worker.

Crosslinker component c) that is used in crosslinkable compositions can also comprise polyfunctional amino- and/or latent amino-functional compounds. These include, for example, polyfunctional species having free primary or secondary amine functional groups such as aliphatic and cycloaliphatic amines each having 2 to 10 primary or secondary amino groups and 2 to 100 carbon atoms. Preferred polyfunctional amines include 2 to 4 primary amino groups and 2 to 20 carbon atoms. Suitable polyfunctional amines include, but are not limited to, hexamethylene diamine, 2-methyl pentamethylene diamine, 1,3-diamino propane, 1,3-diamino pentane, dodecane diamine, 1,2-diamino cyclohexane, 1,4-diamino cyclohexane, para-phenylene diamine, 3-methyl piperidine, piperazine, N-amino ethylpiperazine, isophorone diamine, bis-hexamethylene triamine, diethylene triamine, ethylene diamine, dipropylene triamine, diethylamine triamine, triethylene tetramine, tris (2-aminoethyl)amine, ethylene oxide-amine, polyoxyalkylene amines having from 2 to 6 oxyalkylene units and preferably from 2 to 4 oxypropylene units, such as, JEFFAMINE D, ED and T (JEFFAMINE is a trademark) series polyoxypropylene amine, amine-functional acrylic resins, disclosed in e.g. U.S. Pat. No. 4,120,839, trimethyl hexamethylene diamine; and tetraethylene pentamine. Mixtures of these amine-functional curing agents and adducts of these amines and an epoxy group containing compound, and polyamide amines derived from aliphatic polyamine and a dimer of an unsaturated aliphatic fatty acid, can also be used. Latent amino-functional compounds can also be used, such as moisture deblockable polyfunctional primary or secondary amine species, preferably ketimine, aldimine, diimine or oxazolidine. These compounds react with water to form free amine groups. Especially preferred examples include ketimines formed through the condensation reaction of an amine with a ketone. Examples include the reaction product of adducts of ketone-blocked diethylene triamine or dipropylene triamine and an epoxy or isocyanate containing compound.

In another embodiment, crosslinker c) can also comprise functionalities which are acidic protons (C—H) in activated methylene or methine groups. This embodiment comprises the same features as described in the fourth especially preferred embodiment of film forming resin a1).

According to another embodiment, crosslinker c) comprises functionalities which are activated unsaturated C═C moieties. This embodiment comprises the same features as described for the fifth especially preferred embodiment of film forming resin a1).

Catalyst d)

The crosslinkable composition can optionally comprise a catalyst d) for catalysing the reaction between the functional groups of film forming resin a1), and/or film forming resin b) with crosslinker c) if present, and/or with film forming resin b) and/or with film forming resin a1'). The person skilled in the art will know that the type of catalyst d) will in general depend on the type of functional groups of film forming resin a1) and/or film forming resin b) and the type of crosslinker component c) if present.

In one embodiment, catalyst d) is an organic acid, more particularly selected from the group consisting of sulfonic acids, carboxylic acids, phosphoric acids, acidic phosphoric esters, and mixtures thereof. Preferred are sulfonic acids. Examples of suitable sulfonic acids are dodecylbenzenesulfonic acid (DDBSA), dinonylnaphthalenedisulfonic acid (DNNSA), para-toluenesulfonic acid (pTSA). An acid catalyst can be also used in blocked form. As a result, as is known, improvement is obtained in, for example, the shelf life of the compositions comprising blocked catalysts. Examples of suitable agents for blocking acid catalysts are amines such as preferably tertiary-alkylated or heterocyclic amines. Blocked sulfonic acid catalysts can for example be blocked DDBSA, blocked DNNSA or blocked p-TSA. This blocking of the sulfonic acid catalysts takes place, for example, likewise via amines such as preferably tertiary-alkylated or heterocyclic amines, such as 2-amino-2-methylpropanol, diisopropanolamine, dimethyloxazolidine or trimethylamine, for example. Also possible is the use of covalently blocked sulfonic acid catalysts. In this case, blocking takes place using covalently bonding blocking agents such as epoxy compounds or epoxy-isocyanate compounds, for example. Blocked sulfonic acid catalysts of these kinds are described in detail in the patent publication U.S. Pat. No. 5,102,961. Catalysts are available, for example, under the trade name CYCAT® (from allnex) or NACURE®, and can be used directly in the composition of the invention.

In another embodiment, the catalyst d) is a metal-based catalyst. Preferred metals in the metal-based catalyst include tin, bismuth, zinc, zirconium and aluminium. Preferred metal-based catalysts d) are carboxylate or acetyl acetonate complexes of the aforementioned metals. Preferred metal-based catalysts d) optionally used in the present invention are tin, bismuth and zinc carboxylates, more specifically preferred are dimethyl tin dilaurate, dimethyl tin diversatate, dimethyl tin dioleate, dibutyl tin dilaurate, dioctyl tin dilaurate, and tin octoate, zinc 2-ethylhexanoate, zinc neodecanoate, bismuth 2-ethylhexanoate, bismuth neodecanoate. Also suitable are dialkyl tin maleates, and dialkyl tin acetates. It is also possible to use mixtures and combinations of metal-based catalysts, mixtures of (blocked) acid catalysts and mixtures of metal-based catalysts with (blocked) acid catalysts.

In another embodiment, the reaction between the functional groups of film forming resin a1) and/or film forming resin b) with crosslinker c) if present, and/or with film forming resin b) and/or with film forming resin a1') can be most conveniently catalyzed by a base. Here, any base known in the art is suitable. Some of the usual base catalysts are alkali metal hydroxides, alkali metal alkoxides, quaternary ammonium hydroxides (such as tetraalkyl ammonium hydroxides), and amine compounds (such as diaza compounds, guanidine compounds, amidines including cyclic amidines, pyridine, imidazoline). Suitable catalysts are for example described in EP1462501, herewith incorporated by reference. In this embodiment, the catalyst d) is preferably a carbon dioxide blocked strong base catalyst, more preferably a quaternary alkyl ammonium bi- or alkylcarbonate (as for example described in EP2556108). Another catalyst suitable for use in this embodiment is a homogeneous base catalyst d) is described in EP0326723, which is a catalyst consisting of the combination of a tertiary amine and an epoxide, or in PCT/EP2014/056953 describing a homogeneous catalyst being a salt of a basic anion X– from an acidic X—H group containing compound wherein X is N, P, O, S or C, and wherein anion X– is reactable with film forming resins a1) and/or b) and/or a1') and/or with crosslinker c). Another catalyst suitable to be used in the present embodiment of the invention is a carbamate blocked catalyst as for example described in WO2018/005077.

Reactivity Moderator e)

In one embodiment, the crosslinkable composition, and/or the resin composition A according to the invention comprises at least one reactivity moderator e).

In one embodiment the reactivity moderator is selected from the group consisting of carboxylic acids, compounds of the general formula R—SH, compounds comprising an X—H group having a pKa<12, R—OH, beta diketones, beta-keto esters, alpha hydroxy ketones, and mixtures thereof.

Reactivity moderator e) can be a pot life extender and/or an open time extender. This can be any type of pot life extender or open time extender and many different types of pot life extenders and open time extenders are known to the skilled person. A pot life extender is a component which extends the time required for the viscosity of a crosslinkable composition to double and/or to become so high as to prohibit the convenient application of said crosslinkable composition. An open time extender is a component which prolongs the period during which, upon application of a crosslinkable composition onto a substrate, flow of the composition can occur, hence improving the flow and levelling of the composition and providing improved appearance as well as better hardness development due to reduced solvent entrapment. The person skilled in the art will also know that the type of reactivity moderator e) will in general depend on the type of functional groups present in film forming resin a1) and/or b), the type of functional groups present in crosslinker component c) (if crosslinker c) is present) and the type of catalyst d) selected for the crosslinkable composition according to the invention. Well-known are for example pot life extenders of the types of beta-diketones, beta-keto esters and alpha-hydroxy ketones. Examples of such compounds are 2,4-pentanedione, 1,1,1-trifluoro-2,4-pentanedione, 1,1,1,5,5,5-hexafluoro-2,4-pentanedione, 2,4-hexanedione, 2,4-heptanedione, 5-methyl-2,4-hexanedione 2,4-octanedione, 5,5-dimenthyl-2,4-hexanedione, 3-ethyl-2,4-pentanedione, 2,4-decanedione, 2,2-dimethyl-3,5-nonanedione, 3-methyl-2,4-pentanedione, 2,4-tridecanedione, 1-1-cyclohexyl-1,3-butanedione, 5,5-dimethyl-1,3-cyclohexanedione, 1,3-cyclohexanedione, 1-phenyl-1,3-butanedione, 1(4-biphenyl)-1,3-butanedione, 1-phenyl-1,3-pentanedione, 3-benzyl-2,4, -pentanedione, 1-phenyl-5,5-dimethyl-2,4-hexanedione, 1-phenyl-2-butyl-1,3-butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione, dibenzoylmethane, methyl acetoacetate, ethyl acetoacetate, alpha-methyl ethyl acetoacetate, alpha-n-butyl ethylacetoacetate, alpha-sec-butyl ethyl acetoacetate, alpha ethyl methyl acetoacetate, and alpha-ethyl ethyl acetoacetate, alpha-acetyl-butyrolactone, dimedone and 1-hydroxyanthraquinone, benzoin, acetoin and alpha-hydroxy acetophenone. The particularly preferred pot life extender compound of this class is 2,4-pentanedione.

Another class of reactivity moderator e) which is particularly useful in the crosslinkable composition according to the invention are carboxylic acids, preferably monofunctional carboxylic acids such as acetic acid, butyric acid, propionic acid, acrylic acid, methacrylic acid, phenylacetic acid, benzoic acid, p-methylbenzoic acid, p-nitrobenzoic acid, p-chlorobenzoic acid, p-methoxybenzoic acid, isononanoic acid, 2-ethylhexanoic acid, pentanoic acid, 3-methylbutanoic acid, neodecanoic acid, versatic acid, 3-hydroxy-2,2-dimethylpropionic acid, 2,2-bis(hydroxymethyl)propionic acid, abietic acid, 1-methyl cyclohexanoic acid, diethylmalonic acid, ethylmethylmalonic acid, diethylmalonic acid, 2,2-dimethylsuccinic acid, 2,2-diethylsuccinic acid, 2,2-dimethylglutaric acid, 2,2-dimethylpropionic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, 3-methylisocitric acid, 4,4-dimethylaconitic acid, 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid and bicyclo[2.2.2]octane-1-carboxylic acid or mixtures thereof. Preferred are acetic acid, propionic acid, isononanoic acid, benzoic acid or any of the tertiary acids or mixtures thereof.

Another type of reactivity moderator e) particularly useful in the crosslinkable composition according to the invention are compounds of the general formula R—SH, wherein R can be an alkyl, alkenyl, aryl or aralkyl group. The —SH group can be a primary, secondary or tertiary —SH group. R can be a linear, cyclic or branched group and can comprise one or more other functional groups such as for example hydroxyl groups, primary, secondary or tertiary amine groups, silane or siloxane groups, ether groups, ester groups, carboxylic acid groups. Preferably R is a linear or branched alkyl group of the general formula —$C_nH_{2n+1}$ wherein n is from 4 to 40, more preferably from 8 to 30. Examples are n-$C_{12}H_{25}$SH, n-$C_{16}H_{33}$SH, linear or branched molecules of formula $C_{11}H_{23}$SH, $C_{12}H_{25}$SH and $C_{13}H_{27}$SH, as well as mixtures thereof, and $(CH_3)_2(iPr)C$—$C(CH_3)_2$—$C(CH_3)_2$SH. If R contains more than one other functional groups, these can be different or the same. Particularly hydroxyl or ester groups are preferred as other functional group. In case of R containing an ester group, R preferably has the general formula —$(CH_2)_n(C{=}O)O$—R'. Herein, n can be chosen in the range of 1-20, preferably in the range of 1-10 and particularly preferred n is 1 or 2. R' can be any alkyl, alkenyl, aryl or aralkyl group, preferably containing from 1 to 24 carbon atoms, such as for example butyl, 2-ethylhexyl, iso-octyl, tridecyl, octadecyl. Particularly preferred are complexing agents of formula HS—$(CH_2)_n(C{=}O)O$—R', wherein n is 1 or 2 and wherein R' is an alkyl group containing from 3 to 20 carbon atoms.

The reactivity moderator e) when chosen from the type R—SH can contain multiple —SH groups. Preferred are compounds of formula HS—$(CH_2)_x$—SH wherein x=1 to 20, compounds of formula $(HSCH_2)_{4-m}C(CH_2SCH_2CH_2SH)_m$ wherein m=1 to 4 and similar compounds such as for example described in patents EP 0665219 and EP 0435306. Other pot life/open time extenders e) which are particularly preferred are esters from SH-functional acids, especially SH-functional carboxylic acids, and a polyol. Not necessarily limiting to condensation reaction synthesis only, such products can be obtained by the formation of (poly)ester bonds between for example HS$(CH_2)_n$COOH (wherein n=1 to 20) and a polyol. Preferred are those which are the reaction products of carboxylic acids of formula HS$(CH_2)_n$COOH wherein n is from 1 to 20 and a polyol having an OH-functionality of 2 or more. In this case, the polyol has usually an OH-functionality of 2 or more and can be monomeric, oligomeric or polymeric. Non-limiting examples of such polyols can be glycol, glycerol, trimethylolpropane, neopentyl glycol, pentaerythritol, dipentaerythritol, ethoxylated trimethylolpropane, tri(hydroxyethyl)isocyanurate, castor oil, OH functional polyester, OH functional polyacrylate, polycaprolactone, OH functional polycarbonate, polymers based on diepisulphide monomers as described in U.S. Pat. No. 6,486,298.

Another type of reactivity moderator e) particularly useful in the crosslinkable composition according to the invention are compounds of the general formula R—OH, wherein R can be an alkyl, alkenyl, aryl or aralkyl group. Furthermore, R can be a linear, cyclic or branched group and can comprise one or more other functional groups such as for example ether groups and ester groups. R—OH is preferably a primary alcohol, more preferably a mono-alcohol having 1 to 20, preferably 1-10, more preferably 1-6 carbon atoms, preferably selected from the group of ethanol, n-propanol, n-butanol, n-amyl alcohol and butylglycol.

Another class of reactivity moderator e) which is particularly useful in the crosslinkable composition according to the invention are compounds comprising an X—H group, wherein X is C, N, P, O, or S. The X—H, preferably an N—H group containing component, has preferably a pKa (defined in an aqueous environment) that is lower than 12, more preferably lower than 11, most preferably lower than 10; it is preferably higher than 7, more preferably higher than 8, more preferably higher than 8.5. The X—H comprising reactivity moderator e) preferably comprises a molecule containing the N—H as part of a group —(C=O)—NH—(C=O)—, or of a group —NH—(O=S=O)— or a heterocycle in which the nitrogen of the N—H group is contained in a heterocyclic ring preferably chosen from the group of a substituted or unsubstituted succinimide, glutarimide, hydantoin, triazole, pyrazole, imidazole or uracil, preferably chosen from the group of succinimides, benzotriazoles and triazoles or mixtures thereof.

Another type of reactivity moderator e) particularly useful in the crosslinkable composition according to the invention are photochemical initiators capable of initiating the polymerization of an actinic radiation curable polymer composition under UV light. Photochemical initiators (also called photoinitiators) are compounds that can generate radicals by absorption of light, typically UV light. The amount of photoinitiator in such a radiation curable composition is preferably between 0.1% and 10% by weight, more preferably between 0.5 and 5% by weight, based on the total weight of the radiation curable composition. The radiation curable composition may also comprise from 0 to 5% by weight of one or more photosensitizers well known in the art. Alternatively, the composition can be cured in the absence of an initiator, especially by electron beam. Examples of suitable photoinitiators may be α-hydroxyketones, α-aminoketones, benzyldimethyl-ketals, acyl phosphines, benzophenone derivatives, thioxanthones, and mixtures thereof, and preferably a suitable photoinitiator is selected from the group consisting of α-hydroxyketones, benzophenone, acyl phosphines, and mixtures thereof.

Mixtures of different types of reactivity moderator e) can be used, such as for example mixtures of a carboxylic acid and a compound described by formula R—SH or mixtures of a primary alcohol R—OH and a compound described by the formula X—H.

Rest of the Crosslinkable Composition

The crosslinkable composition according to the invention may optionally comprise one or more of a volatile organic compound f). Volatile organic compounds f) have similar properties as described above under a4)-1. Suitable volatile organic compounds f) may be selected amongst those described under a4)-1 as described here above. The nature of such volatile organic compound f) can be the same or different from the one used in the resin composition A. Usually, the composition according to the invention can be diluted with such volatile organic compounds to a certain application viscosity. The application viscosity can be determined with a rheometer according to ASTM D4287. In general, the amount of volatile organic compound a4)-1+f) present in the composition is such to obtain an application viscosity, measured at 25° C., between 20 and 20000 mPa·s at a shear rate of 1000 s$^{-1}$, preferably between 20 and 10000 mPa·s at a shear rate of 1000 s$^{-1}$, more preferably between 40 and 5000 mPa·s at a shear rate of 1000 s$^{-1}$, even more preferably between 70 and 3000 mPa·s at a shear rate of 1000 s$^{-1}$. Preferably, the coating composition according to the invention comprises less than 700 g/L, preferably less than 650 g/L, more preferably less than 600 g/L, more preferably less than 500 g/L, most preferably less than 400 g/L of volatile organic compound a4)-1+f) based on the total composition at application viscosity.

The resin composition A or crosslinkable composition according to the present invention can also comprise a reactive diluent g). Reactive diluents generally are monomeric or oligomeric liquid compounds comprising at least 1 functional group with a functionality of at least 1. The type of functional group can be similar to the functional group present in film forming resin a1), a1') and/or b). Reactive diluents g) are used to reduce the viscosity of the total crosslinkable composition and which can react with crosslinker c) if present, and with film forming resin a1), a1') and/or film forming resin b), preferably reactive diluent g) is different from film forming resin b). Preferably, reactive diluents are not volatile (having a boiling point higher than 190° C. at atmospheric pressure) and therefore do not contribute to the total volatile organic content of the composition.

In addition to the components described above, other compounds can be present in the crosslinkable composition according to the present invention. Such compounds may be binder resins h) other than film forming resins a1), a1') or b), optionally comprising functionalities which may be crosslinked with the aforesaid film forming resins a1) and/or b) and/or crosslinkers c) if present. Examples of such other compounds are ketone resins, and latent amino-functional compounds such as oxazolidines, ketimines, aldimines, and diimines. These and other compounds are known to the skilled person and are mentioned, int. al., in U.S. Pat. No. 5,214,086.

The crosslinkable composition may also comprise other delustering agents i) that are different from or the same as particulate polyurea compound a2). Examples of such delustering agents i) are inorganic delustering additives, waxes or micronized polymeric delustering agents. Inorganic delustering agents i), in particular inorganic oxides are selected from the group consisting of: $SiO_2$, $Al_2O_3$, $AlPO_4$, MgO, $TiO_2$, $ZrO_2$, $Fe_2O_3$ and mixtures thereof. The oxides may be in a variety of forms, including gelled, precipitated, fumed, colloidal, etc. Inorganic oxides may also include natural minerals, processed/activated minerals, montmorillonite, attapulgite, bentonite, diatomite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof. Silica-based delustering agents i) may optionally be treated with waxes, polymers or inorganic materials. Waxes used as delustering agents i) can be based on polyethylene, polypropylene, carnauba, polytetrafluorethylene (PTFE), fatty acid-based compounds such as stearates, including zinc stearate, and amides. Micronized polymeric delustering agents i) are often based on high molecular weight polymethylurea resins. Furthermore, wax-like micronized polymers based on glucose, starch or other renewable materials can be used as delustering agents i) as well.

The crosslinkable composition may also comprise at least one radical inhibitor. Examples of suitable radical inhibitors include hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT) and the like. Other examples of suitable inhibitors include phosphines, like triphenylphosphine (TPP), and tris-nonylphenylphosphite (TNPP), phenothiazine (PTZ), triphenyl antimony (TPS), and any mixtures thereof. The total amount of inhibitor used is generally from 0 to 1% by weight of the crosslinkable composition, preferably from 0.01% to 0.5% by weight, most preferably from 0.01% to 0.1% by weight.

The crosslinkable composition may further comprise other ingredients, additives or auxiliaries commonly used in coating compositions. These can comprise additives which are commonly used in smaller amounts to improve certain important paint properties. These additives may comprise a volatile part comprising a solvent with a boiling point at atmospheric pressure of 190° C. or less and a non-volatile part. Examples of such additives are for example surfactants, pigment dispersion aids, rheology modifiers, levelling agents, slip additives, wetting agents, anti-cratering agents, antifoaming agents, adhesion promoters, alkoxysilanes, flow modification agents, heat stabilizers, light stabilizers, UV absorbers, fire retardant agents, water, antioxidants and mixtures thereof. The viscosity of the urea-containing formulations can be effectively modified using commonly used dispersing additives, having e.g. acid or base groups. More specifically, dispersing additives such as ADDITOL® XL 6521, ADDITOL® XL 6583 and DISPERBYK® 2150 can be used. The appearance, texture and feel of the final applied coatings, using the crosslinkable composition of the invention, can be effectively modified using various types of flow and levelling and/or wetting and dispersing additives such as ADDITOL® XL 204, ADDITOL® XL 122, ADDITOL® XL 123N, ADDITOL® XL 6577, BYK® 306, BYK® 307, BYK® 104, BYK® 358N, BYK® 310 or BYK® 315. The total amount of pigments, colorants, inert resins, fillers and/or additives in the crosslinkable composition of the invention generally does not exceed 60% by weight, preferably it does not exceed 40% by weight compared to the total weight of the crosslinkable composition.

The crosslinkable composition may also be a pigmented composition. In that case pigments and fillers are present in the composition. A pigment normally is a solid component with low solubility in the paint medium, added to the composition to provide color. The pigmented composition may comprise one or more inorganic pigments and/or one or more organic pigments. A filler is normally also a solid component with low solubility in the paint medium, added to the composition to improve other paint parameters such as increasing the volume of the paint or providing anti-corrosion properties.

In one preferred embodiment, the crosslinkable composition comprises at least one film forming resin a1), preferably comprising a polyester or polyacrylate resin comprising hydroxyl functional groups, a polyurea compound a2), optionally a dispersing agent a3), at least one crosslinker c) preferably comprising isocyanate functional groups, optionally at least one catalyst d) preferably comprising a metal carboxylate, more preferably a dialkyl tin dicarboxylate and optionally at least one reactivity moderator e) preferably comprising a carboxylic acid, a compound with the general formula R—SH or a mixture thereof.

In another preferred embodiment, the crosslinkable composition comprises at least one film forming resin a1), preferably comprising a polyester resin comprising acidic C—H functional groups, a polyurea compound a2), optionally a dispersing agent a3), at least one crosslinker c) preferably comprising activated unsaturated C═C moieties, optionally at least one catalyst d) preferably comprising a base, more preferably a carbon dioxide blocked strong base catalyst, more preferably a quaternary tetraalkyl ammonium bi- or alkylcarbonate and optionally at least one reactivity moderator e) preferably comprising a primary alcohol, a compound with the general formula X—H or a mixture thereof.

In another preferred embodiment, the crosslinkable composition comprises at least one film forming resin a1), preferably comprising a polyester resin comprising acidic C—H functional groups, at least one film forming resin a1') preferably comprising activated unsaturated C═C moieties, a polyurea compound a2), optionally a dispersing agent a3), optionally at least one catalyst d) preferably comprising a base, more preferably a carbon dioxide blocked strong base catalyst, more preferably a quaternary tetraalkyl ammonium bi- or alkylcarbonate and optionally at least one reactivity moderator e) preferably comprising a primary alcohol, a compound with the general formula X—H or a mixture thereof.

In another preferred embodiment, the crosslinkable composition comprises at least one film forming resin a1), preferably comprising activated unsaturated C═C moieties, a polyurea compound a2), optionally a dispersing agent a3), at least one crosslinker c) preferably comprising a polyester resin comprising acidic C—H functional groups, optionally at least one catalyst d) preferably comprising a base, more preferably a carbon dioxide blocked strong base catalyst, more preferably a quaternary tetraalkyl ammonium bi- or alkylcarbonate and optionally at least one reactivity moderator e) preferably comprising a primary alcohol, a compound with the general formula X—H or a mixture thereof.

In another preferred embodiment, the crosslinkable composition comprises at least one film forming resin a1), preferably comprising activated unsaturated C═C moieties, a polyurea compound a2), optionally a dispersing agent a3), optionally one or more film forming resins a1') preferably comprising activated unsaturated C═C moieties, optionally one or more film forming resins b) preferably comprising activated unsaturated C═C moieties, optionally at least one reactivity moderator e) preferably comprising a photoinitiator.

The crosslinkable composition can suitably be prepared by a process comprising mixing the resin composition A with film forming resin a1') and/or b) and/or optionally crosslinker c) and optionally the catalyst d), for a one-component composition. Alternatively, crosslinkable composition can be prepared by a process comprising mixing the resin composition A with optional film forming resin a1') or b) and the catalyst d) to form a binder component and mixing said binder component with the crosslinker c) or film forming resin a1') or b) for a two-component composition. Alternatively, in cases where the crosslinker c) if present or film forming resin a1') or b) does not readily react at storage temperature with film forming resin a1) and/or film forming resin b) in the absence of catalyst d, for example when crosslinker c) comprises activated unsaturated C═C moieties and when film forming resin a1) and/or b) comprises acidic C—H species, the crosslinkable composition can be prepared by mixing the resin composition A with optional film forming resin b) or a1'), with crosslinker c) if present or film forming resin b) or a1') and with optionally reactivity moderator e) to form a binder component and mixing said binder component with the catalyst d) for a two-component crosslinkable composition.

As is usual, in cases where the crosslinker c) is an isocyanate-functional crosslinker, with resin compositions comprising a hydroxy-functional film forming resin and an isocyanate-functional crosslinker, the crosslinkable composition according to the invention has a limited pot life. Therefore, the composition can be suitably provided as a multi-component composition, for example as a two-component composition or as a three-component composition, wherein the hydroxyl functional film forming resin a1), film forming resin a1'), and/or film forming resin b) on the one hand and the isocyanate functional crosslinker c) on the other hand are parts of at least two different components. Therefore, the invention also relates to a kit of parts for preparing a crosslinkable composition, the kit of parts comprising two components, comprising i. a binder module comprising a resin composition A comprising at least one hydroxyl functional film forming resin a1), optionally film forming resin a1'), particulate polyurea component a2), optionally a dispersing agent a3), optionally other components a4), and comprising optionally at least one (hydroxyl functional) film forming resin b), and optionally at least one catalyst d), and optionally at least one reactivity moderator e)

ii. a crosslinker module comprising at least one crosslinker c) comprising isocyanate groups.

Alternatively, the kit of parts may comprise three components, comprising i. a binder module comprising a resin composition A comprising the hydroxyl functional film forming resin component a1), optionally film forming resin a1'), particulate polyurea component a2), optionally a dispersing agent a3), optionally other components a4), and comprising optionally (hydroxyl functional) film forming resin b), ii. a crosslinker module comprising the crosslinker c) comprising isocyanate groups, and iii. a diluent module comprising a volatile organic diluent, wherein the optional catalyst d), can be distributed over modules i, ii or iii, and wherein at least one of the modules optionally comprises the catalyst d).

In cases where the crosslinker c) if present or film forming resin b) or a1') does not readily react at storage temperature with film forming resin a1) and/or film forming resin b), for example when crosslinker c) if present or film forming resin b) or a1') comprises melamine-amino resins and/or blocked isocyanate groups, all components a) to e) could be supplied in one part. Also in cases where no crosslinker c) is required (and therefore no crosslinker c) is present, i.e. in absence of crosslinker c)), and film forming resin b) or a1') does not readily react at storage temperature with film forming resin a1) and/or film forming resin b) in absence of actinic radiation, for example when film forming resin a1) and/or b) and/or a1') comprises activated unsaturated C=C species, all components of the resin composition A, b) and e) could be supplied in one part.

In cases where the crosslinker c) if present or film forming resin b) or a1') does not readily react at storage temperature with film forming resin a1) and/or film forming resin b), in absence of catalyst d), for example when crosslinker c) if present or film forming resin b) or a1') comprises activated unsaturated C=C moieties and when film forming resin a1) and/or b) comprises acidic C—H species, all components of the resin composition A, A', b), c) and e) could be supplied in one part and catalyst d) could be supplied in a separate part. In this case, the invention relates to a kit of parts for preparing a crosslinkable composition, comprising i. a binder module comprising a resin composition A comprising at least one acidic C—H and/or unsaturated C=C functional film forming resin a1), optionally film forming resin a1'), particulate polyurea component a2), optionally a dispersing agent a3), optionally other components a4), and comprising optionally at least one film forming resin b), optionally at least one crosslinker c) comprising activated unsaturated C=C moieties and/or at least one acidic C—H, and optionally at least one reactivity moderator e), ii. a catalyst module comprising at least one catalyst d).

The other components of the crosslinkable composition may be distributed in different ways over the modules as described above, as long as the modules exhibit the required storage stability. Components of the crosslinkable composition which react with each other upon storage, are preferably not combined in one module. If desired, the components of the coating composition may be distributed over even more modules, for example 4 or 5 modules.

In a fourth aspect, the invention is related to a process for coating an article or a substrate, said process comprising the steps of:

(i) applying the crosslinkable composition as described above, (ii) curing the applied composition, to give a reduced gloss coating having a gloss measurement of at most 45 gloss units, preferably at most 30 gloss units, more preferably at most 20 gloss units at a 60° angle (as determined using a BYK Haze-gloss meter) when applied at a Dry Film Thickness (DFT) of between 50 and 60 µm (as measured using a Fischer Permascope MP40E-S).

In a fifth aspect, the invention is related to a substrate coated with the crosslinkable composition as described above. The applied film thickness after drying of the coating is between 30 and 500 µm, preferably between 40 and 250 µm, more preferably between 40 and 100 µm, most preferably between 50 and 60 µm. The substrate has a reduced gloss coating having a gloss measurement of at most 45 gloss units, preferably at most 30 gloss units, more preferably at most 20 gloss units at a 60° angle (as determined using a BYK Haze-gloss meter) when applied at a Dry Film Thickness (DFT) of between 50 and 60 µm (as measured using a Fischer Permascope MP40E-S).

The substrate may be, for example, metal, e.g., iron, steel, tinplate and aluminium, or plastic, wood, glass, synthetic material, paper, leather, concrete or another coating layer. The other coating layer can be comprised of the coating composition of the current invention or it can be a different coating composition. The coating compositions of the current invention show particular utility as clear coats, base coats, pigmented top coats, primers, and fillers.

The crosslinkable composition according to the invention is very suitable for use as a clear coat or pigmented topcoat. A clear coat is essentially free of pigments and is transparent for visible light.

When the crosslinkable composition of the invention is a clear coat, it is preferably applied on wooden substrates, where the wood is optionally pretreated with a sealing layer. When applied directly on the wooden substrate, the clear coat forms the top layer as a monocoat. In the case that the wood is pretreated with another layer, the clear coat of the invention forms the top layer of a multi-layer coating.

Another preferred application of the crosslinkable composition of the invention is as a clear coat applied over a colour- and/or effect-imparting base coat. In that case, the clear coat forms the top layer of a multi-layer lacquer coating such as typically applied on the exterior of automobiles. The base coat may be a water borne base coat or a solvent borne base coat.

Another preferred embodiment of the crosslinkable composition of the invention is as a clear coat applied over plastic objects such as plastic furniture, parts of automobiles and transportation vehicles, toys and electrical appliances.

Another preferred embodiment of the crosslinkable composition of the invention is as a clear coat applied over concrete substrates such as concrete floors or tiles.

Another preferred embodiment of the crosslinkable composition of the current invention is as a pigmented topcoat for coating wooden objects, optionally pretreated with a sealing layer, such as furniture, kitchen cabinets, wooden floors, decorative panels in e.g. automobiles or yachts, wooden construction elements, for coating metal objects such as furniture, bridges, pipelines, agricultural, construction and earth-moving equipment, industrial plants or buildings, oil and gas installations or ships, for coating concrete substrates such as concrete floors or tiles and for coating plastic objects such as furniture, parts of automobiles and transportation vehicles, toys and electrical appliances. The compositions are also suitable for finishing and refinishing automobiles and large transportation vehicles, such as trains, trucks, buses, and airplanes. In general, the crosslinkable composition of the current invention can be applied by spraying, brushing, draw-down or any other method to transfer a composition to a substrate.

Therefore, the invention also relates to a method of providing a coating onto any substrate for any coating application, wherein the method comprises the steps of applying a coating composition according to the invention to at least a part of the surface of an object to be coated, and curing the applied coating composition, preferably in a temperature range of 5 to 180° C. Those skilled in the art will know that the curing temperature will depend on the type of crosslinker c) if present and/or film forming resin a1), and can for example be carried out between 5 and 100° C. or more preferably between 10 and 60° C. The coating compositions of the invention may be at least partially curable upon exposure to actinic radiation. Radiation curable compositions are cured by irradiation, typically by ultraviolet (UV) radiation, generally in the presence of a photo-initiator. They can also be cured by electron-beam irradiation, allowing the use of compositions free of photo-initiator. Radiation curing is accomplished preferably by exposure to high-energy radiation, i.e. UV radiation or daylight, e.g. light with a wavelength of 172 to 750 nm, or by bombardment with high-energy electrons (electron beams, 70 to 300 keV). Various types of actinic radiation can be used such as ultraviolet (UV) radiation, gamma radiation, and electron beam. A preferred means of radiation curing is ultraviolet radiation. According to one embodiment, the UV radiations are UV-A, UV-B, UV-C and/or UV-V radiations.

EXAMPLES

Methods and Materials

The molecular weight and molecular weight distribution was determined according to ASTM D3593 standard by Gel Permeation Chromatography using polystyrene standards, more particularly using size exclusion chromatography. The size-exclusion apparatus used was an Alliance system consisting of a pump, autosampler and He-degasser (Degasys DG-1210 from Uniflows), equipped with a PLgel 5 µm MIXED-C 600×7.5 mm Column and a PLgel 5 µm guard column (50×7.5 mm—Polymer Laboratories). The Column oven (Separations Analytical Instruments) was set at 30° C. Tetrahydrofuran (THF—Extra Dry, Biosolve 206347)+2% acetic acid (Baker 6052) was used as eluent at a flow-rate of 0.8 ml/min. Carbon disulfide (Backer) was used as a marker. A Waters 410 refractive index was used as detector. The injection Volume was 100 µl at a concentration of 1.5 mg/ml. Polystyrene standards (Polymer Laboratories, Easical PS-1, 2010-0501 (M range 580 g/mol-8,500,000 g/mol) and Easical PS-2, 2010-0601 (M range 580 g/mol-400,000 g/mol)) were used for calibration using a third order polynomial. Software used for data-analysis was Empower (Waters). In a plot of the eluded weight fraction versus the molecular weight thus obtained, the Mn is molecular weight at which 50% of the molecules have eluded and the Mw is the molecular weight at which 50% of the total mass has eluded.

Glass transition temperature Tg was determined using Mettler DSC 822E calorimeter according to DEN EN ISO 16805 and ISO 11357. A 7-12 mg sample was first heated well above the Tg at 120° C. This temperature was kept for 5 minutes after which the temperature was brought down to at least 60° C. below the expected Tg in 10 minutes. Subsequently, the sample was heated to 120° C. with a temperature increase of 10° C./minute. The Tg is the temperature at the intersection of the tangent of the baseline and the tangent at the maximum negative slope, in a plot of the heat flow versus temperature.

The hydroxyl value is measured according to the method ASTM E222-17.

The malonate/acetoacetate active C—H equivalent weight was determined by titration of the malonate/acetoacetate containing resin with a 25 wt % sodium methoxide solution in methanol. An azoviolet indicator solution was used to detect the equivalence point.

The Vol %, particle size and particle size distribution are determined using a Malvern Mastersizer S with a He—Ne laser with a wavelength of 632.8 nm, a beam length of 2.4 mm and 42 element array detector, optimised for light scattering measurements, including 2 backscatter detectors. Samples were prepared by diluting 1 gram of film forming resin comprising a polyurea adduct in 9 grams of butyl acetate. Subsequently, the sample was predisturbed using a vortex mixer for 2-3 minutes. The measurement was started when the obscuration was between 10 and 12.5% and the sample had been circulated in the measurement cell for at least 30 seconds. Measurement data were analysed using a polydisperse analysis model based on the Mie theory, assuming a particle refractive index of 1.5330, a continuous medium refractive index of 1.4000 and assuming that the particles are completely non-transparent.

Tack free drying times were determined as follows: in a climatized environment (22° C., 60% relative humidity) a cotton ball was placed on the drying coating, a weight of 1 kg was placed on the cotton ball for 10 seconds, the weight was removed and the cotton ball was blown away. This procedure was repeated as function of time after applying the crosslinkable composition. The coating was said to be tack free when the cotton ball did not leave any visual marks. This time was recorded as the tack free time.

Persoz hardness was measured in a climatized room at 23° C., and 55+/−5% relative humidity. Hardness was measured with a pendulum according to Persoz as described in ASTM D4366.

Haze and gloss were determined using a BYK Haze-gloss meter. Abrasion resistance was determined by scratching the coating 10 times with equal force with 3M281Q WETORDRY™ sanding paper and was expressed as the absolute value of the gloss value at 60° before scratching minus the gloss value at 60° after scratching. A low value means that the coating has a good abrasion resistance.

Xenon resistance was determined according to ISO 11341.

Dry film thicknesses (DFT) were measured on metal panels using a Fischer Permascope MP40E-S.

Viscosity at 0.1 s⁻¹ was determined using a clone-plate MCR302 rheometer supplied by Anton-Paar.

Preparation of Resin 1: A (meth)acrylic polyol having a hydroxyl value of 132 mg KOH/g (on non-volatile content), an acid value of 2.4 mg KOH/g (on non-volatile content), a Mw of 2,867 g/mol and a Mn of 1,303 g/mol (GPC, polystyrene standard) and a Tg of −4° C., was prepared from the polymerization of a mixture of acrylic acid, hydroxy ethyl methacrylate, butyl acrylate, butyl methacrylate and styrene. The (meth)acrylic polyol was dissolved in butyl acetate yielding a solution with a non-volatile content of 78% by weight.

SETALUX® 1915 BA-75 is a 75% solution of an acrylic polyol in butyl acetate.

SETALUX® D A 450 BA-50 is a 50% solution of an acrylic polyol in butyl acetate.

ACURE® 510-100 is a 85% solution of a malonate-functional polyester in butyl acetate.

ACURE® 510-200 is a 85% solution of a malonate-functional polyester in butyl acetate.

ACURE® 550-105 is an acryloyl-functional oligoester.

ACURE® 500 is a carbonate-blocked base catalyst (29.5 wt % solids content) for Michael Addition reactions.

DBTL is a dibutyl tin dilaurate based catalyst commercialized under the name of TINSTAB® BL 277.

MBCHA is 4,4'-methylenebis(cyclohexylamine).

ACEMATT® OK 500 is a fine-grained wax after-treated precipitated silica.

ACEMATT® 3300 is an advanced polymer-treated thermal silica.

DEUTERON® PMH-C is a micronized thermoset polymethylurea.

CERAFLOUR® 1000 is a micronized polymer with wax-like properties.

CERIDUST® 9615A is a micronized blend of polyethylene and amide wax used for gloss-reduction of coatings.

TOLONATE™ HDT 90 is an aliphatic polyisocyanate, based on HDI-trimer (isocyanurate), supplied at 90% solids in a blend of butyl-acetate/high flash aromatic solvent. Average NCO functionality/trimer molecule is approx. 3.6.

TOLONATE™ HDT-LV2 is a solvent free, low viscosity aliphatic polyisocyanate based on HDI-trimer (isocyanurate). Average NCO functionality/trimer molecule is approx. 3.2.

DESMODUR® ultra 2822 is an aliphatic polyisocyanate (55% solids) (HDI trimer). Average NCO functionality/trimer molecule is approx. 3.5.

DESMODUR® N3800 is an aliphatic polyisocyanate (flexibilized HDI trimer). Average NCO functionality/trimer molecule is approx. 3.8.

DESMODUR® N 75 MPA/X is an aliphatic polyisocyanate (75% solids) (HDI biuret) used as hardener component for polyurethane coating systems.

IPDI is isophorone diisocyanate.

ADDITOL® XL 123N is a flow agent and defoamer based on a modified silicone oil.

ADDITOL® VXL 4951N is a fluoro-modified silicone defoamer.

ADDITOL® XL 6521 is a high molecular wetting and dispersing agent with cationic character.

DISPERBYK® 2150 is a high molecular weight wetting and dispersing additive with basic pigment-affinic groups.

CAB 381-20 is cellulose acetate butyrate, a cellulose ester with medium butyryl content and high viscosity.

KRONOS® 2310 is a rutile titanium dioxide pigment.

In the example below, the relative particle size distribution width is calculated according to Eq II and is abbreviated in the tables as '(PS at 90 vol %/PS at 10 vol %)'.

relative particle size distribution width=[(particle size at 90 vol % of the particle size distribution)/(particle size at 10 vol % of the particle size distribution)]   Eq II:

In all examples given below, (near) stoichiometric amounts of isocyanate- and amine-functionalities were used. Furthermore, the isocyanate-functional species used are trimers based on hexamethylenediisocyanate, having an average functionality of 3 to 4 NCO groups per molecule (see average functionality values per used grade of isocyanate trimer above). When reacting such trimer species with mono-amines, the formed amount of urea groups (or formed number of urea bonds or urea linkages) per molecule directly corresponds to the average functionality of the polyisocyanate grade used according to Eq I. In the described examples below, the average number of urea groups (or average number of urea bonds or urea linkages) per molecule therefore is between 3 and 4, and well below 6.

Example A

In the Tables below, Examples are abbreviated as Ex, Comparative Examples are abbreviated as Comp Ex.

Formulations were prepared according to Table 1. All components, except TOLONATE™ HDT-90 were mixed. Subsequently, TOLONATE™ HDT-90 was slowly added while stirring at 370-420 RPM using a propeller stirrer. Resulting average particle size of Example 1 for the polyurea adduct was 40 μm with a cumulative volume percentage of particles smaller than 10 μm of 10% and a cumulative volume percentage of particles larger than 20 μm of 82%. For Example 1, (PS at 90 vol %/PS at 10 vol %)=4.9.

TABLE 1

|  | Comp Ex 1 | Ex 1 | Comp Ex 2 | Comp Ex 3 |
| --- | --- | --- | --- | --- |
| SETALUX ® 1915 BA-75 | 55.0 | 51.2 | 55.0 | 55.0 |
| DBTL (1% in butyl acetate) | 3.0 | 3.0 | 3.0 | 3.0 |
| Butyl acetate | 21.0 | 31.2 | 36.6 | 37.8 |
| n-Dodecyl amine |  | 2.0 |  |  |
| ACEMATT ® OK500 |  |  | 8.2 |  |
| ACEMATT ® 3300 |  |  |  | 4.1 |
| TOLONATE ™ HDT-90 | 20.9 | 21.7 | 20.9 | 20.9 |
| Polyurea on resin [wt %] |  | 9.5 |  |  |
| Polyurea on crosslinkable resin composition [wt %] |  | 6.7 |  |  |
| ACEMATT ® OK500 or 3300 on solid crosslinkable resin composition [wt %]¹ |  |  | 12.0 | 6.4 |

¹calculated as: [(weight of ACEMATT ® OK500 or 3300)/(weight of non-volatile part of SETALUX ® 1915 BA-75 + weight of non-volatile part of TOLONATE ™ HDT-90 + weight of ACEMATT ® OK500 or 3300)] * 100

Paints were applied on glass, followed by measurement of tack free time and Persoz hardness. Paints were also applied on a black solvent borne basecoat, pre-applied on an aluminium panel. Layer thickness for all samples was similar. Results are displayed in Table 2.

TABLE 2

|  | Comp Ex 1 | Ex 1 | Comp Ex 2 | Comp Ex 3 |
|---|---|---|---|---|
| Tack free time [h:mm] | 3:15 | 2:40 | 4:20 | 5:30 |
| Persoz hardness (1d, RT) | 165 | 113 | 120 | 94 |
| Haze | 17 | 204 | 343 | 423 |
| Gloss 60° | 93 | 24 | 45 | 56 |
| Abrasion resistance | 51 | 2 | 13 | 16 |
| Xenon resistance Δ(gloss 60°) after 1600 h | 0.7 | 7 | 46 | 24 |

From the data in Table 2, it becomes clear that the use of polyurea particles according to the invention as delustering agent results in much higher quality coatings. Compared to a formulation without delustering agent (Comparative Example 1), a paint with polyurea particles according to the invention (Example 1) dries faster and has a shorter tack-free time, whereas paints with silica delustering agents increase the tack free time unacceptably. Furthermore, the transparency of coatings containing polyurea delustering agents according to the invention was higher, as becomes clear from the lower haze value measured for Example 1 compared to Comparative Examples 2 and 3. It was, in addition, particularly surprising that the gloss changes after dry scratching and after Xenon resistance were much lower compared to gloss changes obtained with silica based delustering agents.

Example B

Film forming resin containing polyurea delustering agents were prepared according to Table 3, with the composition listed under 'polyurea-containing polyol'. Here, particles sizes were tuned with the process conditions. More particularly, the mentioned amount of benzyl amine was predissolved in the SETALUX® 1915 polyol in the reactor, subsequently TOLONATE™ HDT-90 (diluted to a solids content of 50% using butyl acetate) was dosed into the reactor while stirring at approx. 400 RPM (Ex 2 and 4 and Comp Ex 5) or 125 RPM (Ex 3 and Ex 5 and Comp Ex 4) at 21-32° C. using an anchor-type stirrer. Subsequently, crosslinkable compositions were prepared by adding the remaining components as shown in Table 3, under 'Paint'. All samples were formulated at equal solids contents of 58 wt %.

TABLE 3

|  | Ex 2 | Ex 3 | Ex 4 | Ex 5 | Comp Ex 4 | Comp Ex 5 |
|---|---|---|---|---|---|---|
| Polyurea-containing polyol |  |  |  |  |  |  |
| SETALUX® 1915 BA-75 | 50.0 | 50.0 | 50.0 | 50.0 | 50.0 | 50.0 |
| Benzyl amine | 1.1 | 1.1 | 1.1 | 1.1 | 1.1 | 1.1 |
| Butyl acetate | 21.5 | 9.4 | 9.4 | 9.4 | 0.5 | 0.5 |
| TOLONATE™ HDT-90 (50% in butyl acetate) * | 4.0 | 4.0 | 4.0 | 4.0 | 4.0 | 4.0 |
| Polyurea on resin [wt %] | 7.6 | 7.6 | 7.6 | 7.6 | 7.6 | 7.6 |
| Volume % PS <10 μm | 10 | 16 | 30 | 38 | 86 | 100 |
| Volume % PS >20 μm | 81 | 48 | 15 | 12 | 0 | 0 |

TABLE 3-continued

|  | Ex 2 | Ex 3 | Ex 4 | Ex 5 | Comp Ex 4 | Comp Ex 5 |
|---|---|---|---|---|---|---|
| (PS at 90 vol %/ PS at 10 vol %) | 5.3 | 4.7 | 4.2 | 4.2 | 3.4 | 3.6 |
| Average particle size [μm] | 34 | 20 | 15 | 12 | 7 | 3 |
| PAINT |  |  |  |  |  |  |
| TOLONATE™ HDT-90 | 19.2 | 19.2 | 19.2 | 19.2 | 19.2 | 19.2 |
| DBTL (1% in butyl acetate) | 2.8 | 2.8 | 2.8 | 2.8 | 2.8 | 2.8 |
| Butyl acetate | 1.2 | 13.3 | 13.3 | 12.7 | 22.2 | 22.2 |
| Polyurea on crosslinkable resin composition [wt %] | 5.4 | 5.4 | 5.4 | 5.4 | 5.4 | 5.4 |

* In this experiment, TOLONATE™ HDT-90 was diluted from the normal 90 wt % solids delivery form to 50 wt % solids using butyl acetate.

Paints were applied on a black solvent borne basecoat, pre-applied on an aluminium panel. Haze and gloss were determined. Layer thickness for all samples was similar and ranged between 70 and 80 μm. Results are displayed in Table 4.

TABLE 4

|  | Ex 2 | Ex 3 | Ex 4 | Ex 5 | Comp Ex 4 | Comp Ex 5 |
|---|---|---|---|---|---|---|
| Haze | 59 | 149 | 325 | 488 | 457 | 497 |
| Gloss 60° | 7 | 18 | 44 | 61 | 81 | 80 |

From these data, it is clear that film forming resins containing a volume percentage of the polyurea particles with a diameter smaller than 10 μm of equal or less than 40%, and a volume percentage of particles having a diameter larger than 20 μm of equal or more than 11% according to the invention show a significant delustering effect (Examples 2 to 5), whereas film forming resins containing polyurea particles of which the volume percentage of the particles with a diameter smaller than 10 μm is more than 40% or the volume percentage of the particles with a diameter larger than 20 μm is less than 11%, and thus not according to the invention (Comparative Examples 4 and 5) show only a very small, unacceptable delustering effect when compared to Comparative Example 1. In addition, Comparative Examples 4 and 5 show a very high haze.

Example C

Film forming resin containing polyurea delustering agents and optionally a dispersing agent were prepared according to Table 5a. The mentioned amount of benzyl amine was predissolved in the SETALUX® 1915 polyol in the reactor, subsequently TOLONATE™ HDT-90 (diluted to a solids content of 60% using butyl acetate) was dosed into the reactor while stirring at approx. 125 RPM at 20-30° C. using an anchor-type stirrer. Particle size distribution was subsequently determined. The film forming resins containing the polyurea adducts were diluted to 53% solid content, and subsequently, the viscosity was measured. Furthermore, crosslinkable compositions were prepared by adding the components as shown in Table 5b. All samples were formulated at equal solids contents of 55% of the crosslinkable composition.

TABLE 5a

|  | Ex 6 | Ex 7 | Ex 8 | Ex 9 | Ex 10 | Ex 11 | Ex 12 |
|---|---|---|---|---|---|---|---|
| SETALUX ® 1915 BA-75 | 47.5 | 47.1 | 46.6 | 50.5 | 50.5 | 42.5 | 42.5 |
| ADDITOL ® XL 6521 |  | 0.7 | 1.8 | 3.9 |  | 1.6 | 3.3 |
| Benzyl amine | 1.1 | 1.1 | 1.0 | 1.1 | 0.7 | 0.6 | 0.6 |
| Butyl acetate | 9.4 | 14.0 | 12.6 | 6.2 | 9.8 | 16.9 | 15.3 |
| TOLONATE ™ HDT-90 (60% in butyl acetate) * | 3.1 | 3.1 | 3.1 | 3.3 |  |  |  |
| DESMODUR ® N3800 (60% in butyl acetate) |  |  |  |  | 4.1 | 3.4 | 3.4 |
| Polyurea on resin [wt %] | 7.8 | 7.8 | 7.7 | 7.6 | 7.8 | 7.5 | 7.5 |
| Volume % PS <10 μm | 10 | 5 | 5 | 25 | 5 | 5 | 10 |
| Volume % PS >20 μm | 50 | 70 | 72 | 42 | 56 | 60 | 35 |
| (PS at 90 vol %/ PS at 10 vol %) | 3.3 | 2.8 | 3.2 | 6.7 | 3.0 | 2.8 | 2.8 |
| Average particle size [μm] | 21 | 26 | 28 | 19 | 23 | 23 | 18 |
| Viscosity at 0.1 s$^{-1}$ [Pa · s] | 44 | 9 | 3 | 1.4 | 14 | 0.7 | 0.7 |

* In this experiment, TOLONATE ™ HDT-90 was diluted from the normal 90 wt % solids delivery form to 60 wt % solids using butyl acetate.

TABLE 5b

|  | Ex 6 | Ex 7 | Ex 8 | Ex 9 | Ex 10 | Ex 11 | Ex 12 |
|---|---|---|---|---|---|---|---|
| DBTL (1% in butyl acetate) | 2.5 | 2.5 | 2.4 | 2.7 | 2.7 | 2.2 | 2.2 |
| Butyl acetate | 18.1 | 13..4 | 13 | 20 | 19.2 | 6.5 | 6.5 |
| TOLONATE ™ HDT-90 | 18.2 | 18.1 | 179 | 194 | 19.2 | 16.3 | 16.3 |
| Polyurea on crosslinkable resin composition [wt %] | 5.5 | 5.5 | 5.4 | 5.3 | 5.5 | 5.3 | 5.3 |

The crosslinkable compositions from Tables 5a and 5b were applied by draw-down on a Leneta card at equal layer thickness. Haze and gloss were determined. Results are shown in Table 6.

TABLE 6

|  | Ex 6 | Ex 7 | Ex 8 | Ex 9 | Ex 10 | Ex 11 | Ex 12 |
|---|---|---|---|---|---|---|---|
| Haze | 119 | 82 | 106 | 332 | 119 | 140 | 140 |
| Gloss 60° | 14 | 9 | 12 | 41 | 14 | 18 | 18 |

The data in Tables 5a and 6 indicate that addition of a dispersing agent to a film forming resin containing polyurea particles according to the invention, still resulted in good delustering effects, and low gloss values were obtained. Interestingly, the viscosity of the film forming resin containing the polyurea particles according to the invention decreased significantly upon addition of a dispersing agent, as is obvious when Examples 7 to 9 are compared with Example 6, or Examples 11 and 12 are compared with Example 10, respectively. This lower viscosity will be very beneficial in obtaining a low VOC when paints are prepared at equal viscosity. Furthermore, in spray application, a low viscosity is also beneficial to obtain good levelling and appearance.

Example D

As comparative example Comp Ex 6, a composition was made containing polyurea particles having significantly lower (average) particle size than the examples of the invention. Polyurea Resin 2 was prepared as follows: In a 5 liter glass vessel, equipped with a temperature jacket and a stirrer, Resin 1 (described above) was charged and heated to 30° C. Subsequently, benzyl amine was added to the reaction vessel and the mixture was homogenized for 10 to 15 minutes and subsequently cooled with ice-water. The stirrer speed was increased to 750 rpm and hexamethylene diisocyanate diluted with butyl acetate was added. The reaction mixture was stirred for 30 minutes and further diluted with butyl acetate to a solid content of 66.3 wt %. The obtained polyol component Polyurea Resin 2 contained 4.6 wt % of polyurea product and 61.7 wt % of polyacrylate polyol. Table 7 shows the composition as well as the polyurea particle size data and gloss of the final applied film.

TABLE 7

|  | Comp Ex 6 [g] |
|---|---|
| Polyurea Resin 2 | 103.6 |
| TOLONATE ™ HDT-90 | 34.0 |
| Butyl acetate | 33.2 |
| DBTL (1% in butyl acetate) | 4.1 |
| Total | 175 |
| Polyurea on resin [wt %] | 5.8 |
| Polyurea on crosslinkable resin composition [wt %] | 4.1 |
| Volume % PS < 10 μm | 100 |
| Volume % PS > 20 μm | 0 |
| (PS at 90 vol %/PS at 10 vol %) | 13.8 |
| Average particle size [μm] | 1.8 |
| Gloss 60° | 93 |
| Haze | 43 |

Comp Ex 6 clearly shows that small polyurea particles, having (average) particle sizes outside of the range described in the invention, do not reduce the gloss of crosslinkable compositions.

Example E

Compositions containing polyurea delustering agents were prepared according to Table 8. In the case of Examples 13 and 14, the polyurea product was prepared in the RMA acceptor resin ACURE® 550-105 according to the following procedure: a mixture of the listed amounts of ACURE® 550-105, TOLONATE™ HDT-90 and DISPERBYK® 2150 was prepared in a stirred vessel. Subsequently, a solution of the listed amount of benzyl amine in one third of the listed amount of butyl acetate was fed to the vessel while stirring and processing conditions were adapted to obtain the targeted (average) particle size. More particularly, said solution was fed to the vessel while stirring at 400-450 RPM using an anchor-type stirrer at a reaction temperature between 23 and 30° C. Particle size of the resulting polyurea-modified resin solution was determined according to the previously described method and the polyurea-containing solution was subsequently mixed with the remaining butyl acetate and other components listed in Table 8 to obtain the final Real Michael Addition (RMA) crosslinkable composition. In the case of Example 15, both the RMA donor resin ACURE® 510-100 and the RMA acceptor resin ACURE® 550-105 were modified with the polyurea product, according to the following procedure: 0.26 g of benzyl amine and 0.04 g of DISPERBYK® 2150 were dissolved in 16.9 of ACURE® 510-100. Subsequently, a separately prepared solution of 0.51 g of TOLONATE™ HDT-90 in 11.02 g of butyl acetate was added while stirring and processing conditions were adapted to obtain the targeted (average) particle size. More particularly, said separately prepared solution was added while stirring at 350-400 RPM using an anchor-type stirrer at 23-30° C. Particle size of the resulting polyurea-modified RMA donor resin solution was determined. Separately, a mixture was made of 8.9 g of ACURE® 550-105, 0.04 g of DISPERBYK® 2150 and 0.63 g TOLONATE™ HDT-90, to which a solution of 0.32 g of benzyl amine in 4.0 g of butyl acetate was added while stirring and processing conditions were adapted to obtain the targeted (average) particle size. More particularly, said solution was added while stirring at processing conditions similar to those described for Examples 13 and 14 above. Particle size of the resulting polyurea-modified RMA acceptor resin solution was determined. The polyurea-containing RMA donor and acceptor resin solutions were subsequently mixed and the remaining components listed in Table 8 were added to obtain the final Real Michael Addition (RMA) crosslinkable composition of Example 15.

TABLE 8

|  | Comp Ex 7 [g] | Ex 13 [g] | Ex 14 [g] | Ex 15 [g] |
|---|---|---|---|---|
| ACURE® 510-100 | 33.79 | 33.79 | 16.90 | 16.90 |
| ACURE® 550-105 | 17.75 | 17.75 | 8.9 | 8.9 |
| benzyl amine |  | 0.52 | 0.32 | 0.58 |
| TOLONATE™ HDT-90 |  | 1.02 | 0.63 | 1.14 |
| butyl acetate | 15 | 17.29 | 10.34 | 15.0 |
| n-propanol | 0.4 | 0.4 | 1.16 | 1.16 |
| succinimide | 0.35 | 0.35 | 0.22 | 0.22 |
| triazole solution | 3.21 | 3.21 | 1.07 | 1.07 |
| DISPERBYK® 2150 |  |  | 0.04 | 0.08 |
| ADDITOL® XL 123N | 0.28 | 0.28 | 0.14 | 0.14 |
| ACURE® 500 | 2.5 | 2.5 | 1.25 | 1.25 |
| total | 73.28 | 77.11 | 40.97 | 46.45 |
| Polyurea on ACURE® 550-105 resin [wt %] |  | 7.5 | 9.1 | 9.1 |
| Polyurea on ACURE® 510-100 resin [wt %] |  |  |  | 4.8 |
| Polyurea on crosslinkable resin composition [wt %] |  | 3.0 | 3.7 | 6.5 |
| Vol. fraction of polyurea having PS < 10 µm [%] |  | 24 | 8 | 8/14 [1] |
| Vol. fraction of polyurea having PS > 20 µm [%] |  | 41 | 81 | 81/41 [1] |
| (PS at 90 vol %/PS at 10 vol %) |  | 8.3 | 4.2 | 4.2/3.7 [1] |

TABLE 8-continued

|  | Comp Ex 7 [g] | Ex 13 [g] | Ex 14 [g] | Ex 15 [g] |
|---|---|---|---|---|
| Average particle size [µm] |  | 26 | 33 | 33/26 [1] |
| Gloss 60° | 91 | 71 | 68 | 11 |

[1] Data listed for polyurea product in: ACURE® 550-105/ACURE® 510-100

Paints were applied on Leneta cards by draw-down, followed by measurement of gloss using a BYK gloss meter. Dry film thickness for all samples was similar at around 90 µm. From Table 8, it becomes clear that a polyurea loading of 3.0% on solid binder (Ex 13) does lead to a slight reduction in gloss compared to the reference clear coat Comp Ex 7. The same can be said for Ex 14, having a polyurea loading of 3.7% on solid binder resin. At a higher loading (e.g. 6.5% in Ex 15), the polyurea particles cause a very effective reduction of the gloss. Examples 13 and 14 thus do show a reduction in gloss, however, in practice the effect of reduction in gloss is higher when the polyurea loading on solid binder is higher.

Example F

Compositions containing polyurea and/or conventional silica-based delustering agents and a dispersing agent were prepared according to Table 9. In this case, the polyurea compound was prepared in the RMA donor resin to achieve the composition listed under A in Table 9 and according to the following procedure: a solution of one third of the listed amount of ACURE® 510-100 and the listed amount of DISPERBYK® 2150 in one third of the listed amount of butyl acetate was prepared in a stirred vessel. Subsequently, the following two separately prepared solutions were fed to the vessel simultaneously: 1) the listed amount of 3-methoxy propylamine or benzyl amine and one third of the listed amount of ACURE® 510-100 in one third of the listed amount of butyl acetate; 2) the listed amount of TOLONATE™ HDT-90 or DESMODUR® ultra 2822 and one third of the listed amount of ACURE® 510-100 in one third of the listed amount of butyl acetate. Processing conditions were adapted to obtain the targeted particle size. More particularly, said two separately prepared solutions were fed to the vessel simultaneously, while stirring at 350-400 RPM using an anchor-type stirrer at 23 to 30° C. The particle size distribution of the resulting polyurea-modified resin solution was determined and the polyurea-containing solution was subsequently mixed with the pigment dispersion listed in Table 9 under B and the remaining components listed under C in Table 9, affording the final Real Michael Addition (RMA) crosslinkable composition.

These compositions were applied onto glass and metal panels by conventional spray application to a dry film thickness of approx. 70 µm. Results are shown in Table 10.

TABLE 9

|  | Comp Ex 8 [g] | Comp Ex 9 [g] | Ex 16 [g] | Ex 17 [g] | Ex 18 [g] | Ex 19 [g] |
|---|---|---|---|---|---|---|
| A |  |  |  |  |  |  |
| ACURE® 510-100 | 10.69 | 10.69 | 10.68 | 11.13 | 10.68 | 11.13 |
| benzyl amine |  |  | 0.33 |  | 0.33 |  |
| 3-methoxypropylamine |  |  |  | 0.32 |  | 0.32 |
| TOLONATE™ HDT-90 |  |  | 0.64 |  | 0.64 |  |
| DESMODUR® ultra 2822 (55% solids) |  |  |  | 1.14 |  | 1.14 |

TABLE 9-continued

|  | Comp Ex 8 [g] | Comp Ex 9 [g] | Ex 16 [g] | Ex 17 [g] | Ex 18 [g] | Ex 19 [g] |
|---|---|---|---|---|---|---|
| butyl acetate |  |  | 6.48 | 6.29 | 6.48 | 6.29 |
| DISPERBYK ® 2150 |  |  | 0.02 | 0.05 | 0.02 | 0.05 |
| Polyurea on resin [wt %] |  |  | 9.1 | 9.1 | 9.1 | 9.1 |
| B |  |  |  |  |  |  |
| ACURE ® 550-105 | 6.73 | 6.73 | 6.73 | 6.73 | 6.73 | 6.73 |
| KRONOS ® 2310 | 13.29 | 13.29 | 13.29 | 13.29 | 13.29 | 13.29 |
| DISPERBYK ® 2150 | 0.67 | 0.67 | 0.67 | 0.67 | 0.67 | 0.67 |
| C |  |  |  |  |  |  |
| ACURE ® 550-105 | 0.98 | 0.98 | 0.98 | 0.98 | 0.98 | 0.98 |
| n-propanol | 0.75 | 0.75 | 0.75 | 0.75 | 0.75 | 0.75 |
| butyl acetate | 2.75 | 8.25 | 2.25 | 2.75 | 2.75 | 2.55 |
| succinimide | 0.074 | 0.074 | 0.074 | 0.074 | 0.074 | 0.074 |
| triazole (15% in propanol) | 0.69 | 0.69 | 0.69 | 0.69 | 0.69 | 0.69 |
| ACEMATT ® 3300 |  | 2.25 |  |  | 0.75 | 0.75 |
| ADDITOL ® XL 123N | 0.09 | 0.09 | 0.09 | 0.09 | 0.09 | 0.09 |
| ACURE ® 500 | 0.81 | 0.81 | 0.81 | 0.81 | 0.81 | 0.81 |
| total | 37.52 | 45.27 | 44.48 | 45.76 | 45.73 | 46.31 |
| Polyurea on crosslinkable resin composition [wt %] |  |  | 5.1 | 5.2 | 5.1 | 5.2 |
| ACEMATT ® 3300 on crosslinkable resin composition [wt %] [1] |  | 11.8 |  |  | 4.3 | 4.2 |
| Vol. fraction of polyurea having PS <10 μm [%] | n/a | n/a | 13 | 13 | 13 | 13 |
| Vol. fraction of polyurea having PS >20 μm [%] | n/a | n/a | 66 | 56 | 66 | 56 |
| (PS at 90 vol %/PS at 10 vol %) |  |  | 4.7 | 2.5 | 4.7 | 2.5 |
| Average particle size [μm] | n/a | n/a | 24 | 21 | 24 | 21 |

[1] calculated as: [(weight of ACEMATT ® 3300)/(weight of non-volatile part of ACURE ® 510-100 + weight of non-volatile part of ACURE ® 550-105 + weight of ACEMATT ® 3300)] * 100

Comp Ex 8 is a high gloss white topcoat without delustering additives added. Clearly, the addition of the ACEMATT®3300 silica-based delustering agent has a detrimental effect on the drying time of the RMA composition and on the final hardness of the coating (Comp Ex 9, Table 10). Also, a rather high amount of this additive is needed to achieve sufficiently low gloss values, compared to the polyurea-containing Ex 17.

TABLE 10

|  | Comp Ex 8 | Comp Ex 9 | Ex 16 | Ex 17 | Ex 18 | Ex 19 |
|---|---|---|---|---|---|---|
| Tack free time [min] | 50 | 120 | 50 | 50 | 70 | 70 |
| Persoz hardness 4 d, RT [s] | 118 | 84 | 106 | 106 | 107 | 104 |
| Gloss 60° | 94 | 6 | 28 | 11 | 16 | 9 |
| Appearance | good | good | good | good | good | good |
| xylene resistance, 5 min. | good | good | good | good | good | good |

From Ex 16, it can be seen that at 5.1% polyurea on crosslinkable composition, already significant delustering is achieved. By combining polyurea and silica delustering agents, the gloss can be reduced somewhat further (compare Ex 16 to Ex 18 and Ex 17 to Ex 19, respectively).

Example G

The polyurea delustering particles of the invention were also combined with non-silica based delustering agents (Table 11). These compositions were prepared according to the previously described general procedure, and also see Example F. Ex 20 is a reference composition containing only polyurea particles. Comp Ex 10 and Comp Ex 11 only contain micronized thermoset polymethylurea particles or wax-like micronized polymer particles, respectively. While Ex 20 shows a strongly reduced gloss (Table 12), Comp Ex 10 and Comp Ex 11 are quite high in gloss. When combining the polyurea particles of the invention with either DEUTERON® PMH-C (Ex 21) or with CERAFLOUR® 1000 (Ex 22), especially the gloss at 60° can be reduced compared to Ex 20, with only minor drying retardation and hardness decrease (Table 12).

TABLE 11

|  | Ex 20 [g] | Comp Ex 10 [g] | Comp Ex 11 [g] | Ex 21 [g] | Ex 22 [g] |
|---|---|---|---|---|---|
| A |  |  |  |  |  |
| ACURE ® 510-100 | 46.5 | 10.69 | 10.69 | 46.5 | 46.5 |
| 3-methoxypropylamine | 1.34 |  |  | 1.34 | 1.34 |
| DESMODUR ® ultra 2822 (55% solids) | 4.76 |  |  | 4.76 | 4.76 |
| butyl acetate | 26.21 |  |  | 26.21 | 26.21 |
| DISPERBYK ® 2150 | 0.20 |  |  | 0.20 | 0.20 |
| Polyurea on resin [wt %] | 9.1 |  |  | 10.0 | 10.0 |
| B |  |  |  |  |  |
| ACURE ® 550-105 | 26.93 | 7.71 | 7.71 | 26.93 | 26.93 |
| KRONOS ® 2310 | 53.17 | 13.29 | 13.29 | 53.17 | 53.17 |
| DISPERBYK ® 2150 | 2.66 | 0.67 | 0.67 | 2.66 | 2.66 |
| C |  |  |  |  |  |
| ACURE ® 550-105 | 3.9 |  |  | 3.9 | 3.9 |
| n-propanol | 3 | 0.75 | 0.75 | 3 | 3 |

TABLE 11-continued

|  | Ex 20 [g] | Comp Ex 10 [g] | Comp Ex 11 [g] | Ex 21 [g] | Ex 22 [g] |
|---|---|---|---|---|---|
| butyl acetate | 9 | 2.75 | 2.75 | 9 | 9 |
| succinimide | 0.296 | 0.074 | 0.074 | 0.296 | 0.296 |
| triazole (15% in propanol) | 2.76 | 0.69 | 0.69 | 2.76 | 2.76 |
| DEUTERON ® PMH-C |  | 1.7 |  | 7.11 |  |
| CERAFLOUR ® 1000 |  |  | 1.7 |  | 7.11 |
| ADDITOL ® XL 123N | 0.36 | 0.09 | 0.09 | 0.36 | 0.36 |
| ACURE ® 500 | 3.23 | 0.81 | 0.81 | 3.23 | 3.23 |
| total | 184.32 | 39.22 | 39.22 | 191.43 | 191.43 |
| Polyurea on crosslinkable resin composition [wt %] | 5.3 |  |  | 5.3 | 5.3 |
| Conv. delustering agent on crosslinkable resin composition [wt %] [1] |  | 9.2 | 9.2 | 9.2 | 9.2 |
| Vol. fraction of polyurea having PS < 10 μm [%] | 13 | n/a | n/a | 13 | 13 |
| Vol. fraction of polyurea having PS > 20 μm [%] | 55 | n/a | n/a | 55 | 55 |
| (PS at 90 vol %/PS at 10 vol %) | 3.9 |  |  | 3.9 | 3.9 |
| Average particle size [μm] | 21 | n/a | n/a | 21 | 21 |

[1] calculated as: [(weight of conventional delustering agent)/(weight of non-volatile part of ACURE ® 510-100 + weight of non-volatile part of ACURE ® 550-105 + weight of conventional delustering agent)] * 100

TABLE 12

|  | Ex 20 | Comp Ex 10 | Comp Ex 11 | Ex 21 | Ex 22 |
|---|---|---|---|---|---|
| Tack free time [min] | 50 | 72 | 110 | 60 | 60 |
| Persoz hardness 4d, RT [s] | 111 | 69 | 80 | 103 | 102 |
| Gloss 60° | 18 | 89 | 88 | 11 | 7 |
| Appearance | good | good | good | good | good |
| Abrasion resistance | good | medium | medium | good | good |

Example H

Additional clear RMA crosslinkable compositions were prepared as shown in Table 13, based on different malonate-functional polyester binders. In the case of Examples 23 and 25, the polyurea component was prepared in the ACURE® 550-105 RMA acceptor resin, in the case of Example 24, the polyurea component was prepared in the ACURE® 510-100 donor resin according to the general procedure previously described, and also see Example E. It is clear (from the results shown in Table 13) that the effect of a certain loading of polyurea particles of the invention is robust and gloss reduction is similar, regardless of the type of malonated polyester binder resin used (compare Ex 24 and Ex 25). Also, it is shown (compare Ex 23 and Ex 24) that the gloss can be reduced to very low levels by further increasing the loading of this particular polyurea adduct.

TABLE 13

|  | Ex 23 [g] | Ex 24 [g] | Ex 25 [g] |
|---|---|---|---|
| ACURE ® 510-100 | 49.36 | 10.77 |  |
| ACURE ® 510-200 |  |  | 27.18 |
| ACURE ® 550-105 | 27.48 | 7.71 | 14.94 |
| 3-methoxypropylamine | 1.35 | 0.37 | 0.73 |
| DESMODUR ® ultra 2822 (55% solids) | 5.04 | 1.32 | 2.75 |
| butyl acetate | 28.12 | 9.06 | 17.57 |
| n-propanol | 4.13 |  | 2.24 |

TABLE 13-continued

|  | Ex 23 [g] | Ex 24 [g] | Ex 25 [g] |
|---|---|---|---|
| succinimide | 0.64 | 0.07 | 0.35 |
| DISPERBYK ® 2150 | 0.27 | 0.05 | 0.15 |
| ADDITOL ® XL 123N | 0.5 | 0.09 | 0.27 |
| ADDITOL ® VXL 4951N | 0.83 |  | 0.45 |
| ACURE ® 500 | 3.77 | 0.81 | 2.05 |
| total | 121.49 | 30.25 | 68.68 |
| Polyurea on ACURE ® 550-105 [wt %] | 13.0 |  | 13.0 |
| Polyurea on ACURE ® 510-100 [wt %] |  | 10.7 |  |
| Polyurea on crosslinkable resin composition [wt %] | 5.6 | 6.1 | 5.6 |
| Vol. fraction of polyurea having PS < 10 μm [%] | 4 | 8 | 4 |
| Vol. fraction of polyurea having PS > 20 μm [%] | 80 | 70 | 80 |
| (PS at 90 vol %/PS at 10 vol %) | 5.2 | 3.5 | 5.2 |
| Average particle size [μm] | 29 | 25 | 29 |
| Gloss 60° | 32 | 4 | 29 |

Example I

The film forming, delustered compositions of the invention also show a very good stability of the delustering effect as a function of the dry film thickness (DFT), as demonstrated by Ex 26, Tables 14 and 15 (clear coating), and Ex 27, Tables 14 and 16 (white pigmented coating). This means that a robust and reproducible low gloss can be achieved regardless of the applied DFT.

TABLE 14

|  | Ex 26 [g] | Ex 27 [g] |
|---|---|---|
| A |  |  |
| ACURE ® 510-100 | 175.05 | 10.71 |
| 3-methoxypropylamine | 5.82 | 0.31 |
| TOLONATE ™ HDT-LV2 | 11.96 |  |
| DESMODUR ® ultra 2822 |  | 1.09 |
| butyl acetate | 103.29 | 6.04 |
| DISPERBYK ® 2150 | 1.48 | 0.05 |
| ADDITOL ® VXL 4951N | 0.74 |  |
| Polyurea on resin [%] | 10.7 | 9.1 |
| B |  |  |
| ACURE ® 550-105 |  | 6.73 |
| KRONOS ® 2310 |  | 13.29 |
| DISPERBYK ® 2150 |  | 0.67 |
| C |  |  |
| ACURE ® 550-105 | 97.28 | 0.98 |
| n-propanol | 12.38 |  |
| butyl acetate |  | 3.20 |
| succinimide | 0.75 | 0.09 |
| ADDITOL ® XL 123N | 1.49 | 0.09 |
| ADDITOL ® VXL 4951N | 2.48 |  |
| ACURE ® 500 | 13.34 | 0.81 |
| total | 426.06 | 44.06 |
| Polyurea on crosslinkable resin composition [wt %] | 6.7 | 5.1 |
| Vol. fraction of polyurea having PS < 10 μm [%] | 16 | 13 |
| Vol. fraction of polyurea having PS > 20 μm [%] | 52 | 55 |
| (PS at 90 vol %/PS at 10 vol %) | 7.1 | 3.9 |
| Average particle size [μm] | 21 | 21 |

TABLE 15

| DFT [μm] | Gloss 60° |
| --- | --- |
| 20 | 10.5 |
| 30 | 15.3 |
| 70 | 18 |
| 90 | 17.3 |
| 80 | 25 |
| 115 | 17 |
| 190 | 26 |
| 200 | 23 |
| 230 | 23.3 |
| 240 | 24.4 |
| 420 | 31 |
| 430 | 25.3 |

TABLE 16

| DFT [μm] | Gloss 60° |
| --- | --- |
| 25 | 5.3 |
| 35 | 17.2 |
| 39 | 7.8 |
| 45 | 10 |
| 50 | 14.9 |
| 61 | 9.1 |
| 71 | 9.8 |
| 77 | 12 |
| 90 | 11.7 |
| 94 | 20.9 |
| 105 | 13.4 |
| 114 | 10 |
| 122 | 14.8 |
| 123 | 10.4 |
| 137 | 11.8 |
| 180 | 19.5 |
| 240 | 18.3 |

Example J

TABLE 17

| | Comp Ex 12 [g] | Comp Ex 13 [g] |
| --- | --- | --- |
| A | | |
| ACURE ® 510-100 (83 wt % in butyl acetate) | 37.85 | 37.85 |
| MBCHA (40 wt % in butyl acetate) | 3.82 | |
| MBCHA (40 wt % in xylene/isopropanol, 50/50 wt/wt) | | 3.82 |
| IPDI | 1.63 | 1.63 |
| Polyurea on resin [%] | 9.1 | 9.1 |
| B | | |
| ACURE ® 550-105 | 23.95 | 23.95 |
| KRONOS ® 2310 | 47.29 | 47.29 |
| DISPERBYK ® 2150 | 2.38 | 2.38 |
| C | | |
| ACURE ® 550-105 | 3.66 | 3.66 |
| n-propanol | 2.67 | 2.67 |
| butyl acetate | 2.67 | 2.67 |
| succinimide | 0.26 | 0.26 |
| ADDITOL ® XL 123N | 0.32 | 0.32 |
| ADDITOL ® VXL 4951N | 0.53 | 0.53 |
| ACURE ® 500 | 2.88 | 2.88 |
| total | 129.91 | 129.91 |
| Polyurea on crosslinkable resin composition [wt %] | 5.1 | 5.1 |
| Vol. fraction of polyurea having PS < 10 μm [%] | 27 | 41 |
| Vol. fraction of polyurea having PS > 20 μm [%] | 49 | 35 |
| (PS at 90 vol %/PS at 10 vol %) | 15.6 | 12.8 |
| Average particle size [μm] | 34 | 21 |
| Gloss 60° | 73 | 84 |

The crosslinkable compositions of Comp Ex 12 and Comp Ex 13 contain polyurea particles based on a diamine and a diisocyanate prepared according to the method described in JP2629747. This method resulted in formation of a high amount of polyurea particles with a very large diameter, as expressed by the relative particle size distribution width (in Table 17). Furthermore, the average number of urea bonds in the polyurea compound formed (with the method described in JP2629747) is higher than 6. Moreover, although the average particle size of the polyurea particles in Comp Ex 12 and Comp Ex 13 was similar to the average particle size of polyurea particles according to the invention, and gloss reduction was observed, it was also, and more importantly, observed that the resulting coating suffered from severe lump-defects (leading to poor coating appearance), making this method described in JP2629747 highly unsuitable for preparation of high quality coatings with reduced gloss. Therefore, Comp Ex 12 and Comp Ex 13 cannot be used to prepare low gloss coatings with a good appearance.

Example K

The crosslinkable composition according to the invention, comprising the particulate polyurea compound according to the invention was also applied in UV curable paint systems. By tuning i.a. the urea composition, content (of the polyurea compound) and particle size (of the particles of the particulate polyurea compound) and by using appropriate additives to improve viscosity and paint flow/appearance, it is possible to prepare urea-containing, acrylate-functional binders and/or crosslinkers if present that can effectively lead to (very) low gloss energy-curable coatings.

Trimethylolpropane trisacrylate (TMPTA) and ditrimethylolpropane tetraacrylate (DiTMPTA) where used as carrier resins in which the particulate polyurea compound according to the invention was made as described previously. These resin compositions listed under section A in Table 18 were mixed with a mixture listed under section B in Table 18 comprising photoinitiators. Compositions comprising the particulate polyurea compound as well as comparative compositions not containing the polyurea compounds and the relevant properties are given in Table 18. These samples were bar-applied on metal, wood and plastic substrates and cured through irradiation with UV light, after flash off. Dry film thickness was approx. 40-50 μm. A UV-H 254 UV lamp by Panacol-Elosol GmbH was used to cure the films.

TABLE 18

| | Comp Ex 14 [g] | Ex 28 [g] | Comp Ex 15 [g] | Ex 29 [g] | Ex 30 [g] |
| --- | --- | --- | --- | --- | --- |
| A | | | | | |
| ACURE ® 550-100 (TMPTA) | 100 | 430.0 | | | 430.0 |
| ACURE ® 550-105 | | | 100 | 430.0 | |

TABLE 18-continued

| | Comp Ex 14 [g] | Ex 28 [g] | Comp Ex 15 [g] | Ex 29 [g] | Ex 30 [g] |
|---|---|---|---|---|---|
| (DiTMPTA) | | | | | |
| 3-methoxypropylamine | | 16.3 | | 16.3 | 16.3 |
| DESMODUR ® ultra 2822 (55% solids) | | 64.0 | | 64.0 | 64.0 |
| butyl acetate | | 140.0 | | 140.0 | 140.0 |
| ADDITOL ® XL 6521 | | 4.3 | | 4.3 | 4.3 |
| total | | 654.6 | | 654.6 | 654.6 |
| B | | | | | |
| 1-hydrocyclohexyl phenyl ketone | 6 | 6 | 6 | 6 | 0.54 |
| diphenyl(2,4,6-trimethylbenzoyl)phosphine oxide | 4 | 4 | 4 | 4 | 0.36 |
| butyl acetate | 90 | 90 | 90 | 90 | 5 |
| total | 100 | 100 | 100 | 100 | 5.9 |
| C | | | | | |
| EBECRYL ® 265 | | | | | 100 |
| Crosslinkable composition | | | | | |
| amount of A | 54 | 80 | 54 | 80 | 22.14 |
| amount of B | 16 | 16 | 16 | 16 | 5.9 |
| amount of C | | | | | 15 |
| butyl acetate | | 10 | | 10 | |
| Polyurea on crosslinkable resin composition [wt %] | | 12.0 | | 12.0 | 5.9 |
| Vol. fraction of polyurea having PS < 10 μm [%] | | 11 | | 10 | 11 |
| Vol. fraction of polyurea having PS > 20 μm [%] | | 78 | | 62 | 78 |
| (PS at 90 vol %/PS at 10 vol %) | | 4.5 | | 3.9 | 4.5 |
| Average particle size [μm] | | 30 | | 23 | 30 |
| Gloss 60° | 70.1 | 1 | 84.9 | 13 | 13 |

The results for Ex 28 and Ex 29 in Table 18 clearly show that the gloss of the TMPTA- and DiTMPTA-based, UV-cured coatings was reduced very effectively using the particulate polyurea compound according to the invention, compared to the corresponding references Comp Ex 14 and Comp Ex 15 without polyurea particles. In addition, Ex 30 demonstrates that the resin composition comprising the particulate polyurea compound can also be mixed with other resins to further tune the degree of gloss reduction and other relevant coating properties.

Example L

The crosslinkable composition according to the invention, comprising the particulate polyurea compound a2) according to the invention, was also applied in a low solids clearcoat formulation for wood applications (below example 31 according to the present invention) and was compared to a conventionally delustered clearcoat (comparative example 16 below) containing silica- and wax-based delustering agents as well as a Cellulose Acetate Butyrate (CAB) compound to impart a suitable rheological behavior to the paint. Clearcoat compositions are given in Table 19, test results are given in Table 20.

To prepare the resin composition A comprising the particulate polyurea compound a2) according to the invention, the amount of 3-methoxypropylamine mentioned in Table 19 was predissolved in the SETALUX® D A 450 polyol in the reactor, subsequently DESMODUR® ultra 2822 was dosed into the reactor while stirring at approx. 125 RPM at 20-30° C. using an anchor-type stirrer.

TABLE 19

| | Comp Ex 16 [g] | Ex 31 [g] |
|---|---|---|
| A | | |
| SETALUX ® D A 450 BA-50 | 89.44 | 74.76 |
| 3-methoxypropylamine | | 0.94 |
| DESMODUR ® ultra 2822 (55% solids) | | 3.85 |
| ACEMATT ® OK 500 | 6.26 | |
| CERIDUST ® 9615A | 2.69 | |
| butyl acetate | 92.96 | 63.09 |
| ADDITOL ® XL 6521 | | 0.37 |
| ADDITOL ® XL 204 | | 0.17 |
| CAB 381-20 (16.6% in butyl acetate) | 10.73 | |
| Total A | 202.08 | 143.18 |
| B | | |
| DESMODUR ® N 75 MPA/X | 20.83 | 12.4 |
| butyl acetate | 15.9 | 82.0 |
| Total A + B | 238.81 | 237.58 |
| Polyurea on crosslinkable resin composition [wt %] | | 6.6 |
| Conv. delustering agent on crosslinkable resin composition [wt %] | 14.9 | |
| Vol. fraction of polyurea having PS < 10 μm [%] | | 11 |
| Vol. fraction of polyurea having PS > 20 μm [%] | | 51 |
| (PS at 90 vol %/PS at 10 vol %) | | 4.0 |
| Average particle size [μm] | | 25 |

TABLE 20

| | 1 layer | | | | 2 layers | | | |
|---|---|---|---|---|---|---|---|---|
| | | gloss | | | | gloss | | |
| | haze | 20° | 60° | 85° | haze | 20° | 60° | 85° |
| Comp Ex 16 | 53 | 0.9 | 6.9 | 13.5 | 185 | 3.7 | 25 | 53.3 |
| Ex 31 | 26 | 0.6 | 4.0 | 3.3 | 27 | 0.7 | 4.3 | 4.0 |

As clearly demonstrated in Table 20, Ex 31 provides a significantly more robust delustering performance than Comp Ex 16: when applied as 1 layer of approx. 30 μm, low haze and very low gloss values are observed for Ex 31, even at a close to horizontal angle of 85°. Comp Ex 16, has a higher haze and gloss increases with increasing gloss measurement angle. When a second 30 μm layer is applied on top of the first layer, haze and gloss remain very low for Ex 31, while Comp Ex 16 shows a deterioration of the clarity (i.e. increased haze) as well as a significant reduction in delustering effect, especially at 60 and 85 degree angles. It can be concluded that the results for Ex 31 according to the present invention are superior to the results for Comp Ex 16. Indeed, Ex 31 clearly shows that the absence of a CAB compound in the crosslinkable composition, using the particulate urea compound of the invention, provides an improved delustering effect (even at viewing angles close to the horizontal plane) as well as an improved stability of this effect as a function of the number of layers applied.

The invention claimed is:

1. A particulate polyurea compound a2) for reducing gloss of coatings, wherein:
   the volume percentage of particles of the particulate polyurea compound a2) having a diameter of smaller than 10 μm is equal to or less than 40%, and the volume percentage of particles of the particulate polyurea compound a2) having a diameter larger than 20 µm is equal to or more than 11%, the average particle size of the polyurea compound a2) is from 11 to 80 µm, and the polyurea compound a2) comprises an average number of urea bonds of at least two and at most six urea bonds per molecule.

2. The particulate polyurea compound a2) according to claim 1, wherein the relative particle size distribution width, which is the ratio between the particle size at 90 vol % of the particle size distribution and the particle size at 10 vol % of the particle size distribution, is between 1 and 10.

3. The particulate polyurea compound a2) according to claim 1, wherein the average particle size of the polyurea compound a2) is from 15 to 80 µm.

4. The particulate polyurea compound a2) according to claim 1, wherein the polyurea compound a2) is formed from the reaction of a polyisocyanate or its isocyanurate, biuret, or uretdione derivative, or condensed derivatives of polyisocyanate, with at least one amine.

5. The particulate polyurea compound a2) according to claim 4, wherein the polyisocyanate is selected from the group consisting of hexamethylene-1,6-diisocyanate (HMDI), its isocyanurate trimer or biuret, trans-cyclohexylene-1,4-diisocyanate, para- and meta-xylylene diisocyanate, toluene diisocyanate, and mixtures thereof; and/or the amine is a mono-amine and is a primary amine.

6. The particulate polyurea compound a2) according to claim 1, wherein the average number of urea bonds in the polyurea compound a2) is at least 2 and at most 4.5 per molecule.

7. A resin composition A comprising a film forming resin a1) comprising
   at least two functional groups, each functional group having a functionality of at least 1, and/or
   at least one functional group having a functionality of at least 2;

a particulate polyurea compound a2) according to claim 1;

optionally, a dispersing agent a3); and optionally, one or more of a compound a4) different from a1), a2) and a3).

8. The resin composition A according to claim 7, wherein the particulate polyurea compound a2) is present at a content between 3 and 30 wt % in view of the total weight of film forming resin a1) and polyurea compound a2).

9. The resin composition A according to claim 7, wherein,
the polyurea compound a2) is present between 2.5 and 20 wt %;
the film forming resin a1) is present between 1% and 97.5 wt %;
the dispersing agent a3) is present between 0 and 10 wt %, and
the one or more compound a4) is present between 0% and 96.5 wt %, in view of the total weight of the resin composition A, the sum of weight percentages not exceeding 100%.

10. The resin composition A according to claim 7, wherein the polyurea compound a2) is prepared in the presence of the film forming resin a1).

11. The resin composition A according to claim 7, wherein the dispersing agent a3) is present and is selected from the group consisting of polyesters, polyurethanes and polyacrylates with pigment-affinic anionic, cationic or nonionic groups, and block copolymers with basic pigment affinic groups, and combinations thereof.

12. The resin composition A according to claim 7, wherein a4) is an organic solvent a4)-1 and/or an additive a4)-2.

13. The resin composition A according to claim 7, comprising a reactivity moderator e), which reactivity moderator is selected from the group consisting of carboxylic acids, compounds of the general formula R—SH, compounds comprising an X—H group having a pKa<12, R—OH, beta-diketones, beta-keto esters, alpha-hydroxy ketones, and mixtures thereof, wherein R is an alkyl, alkenyl, aryl or aralkyl group, and wherein X is C, N, P, O, or S.

14. The resin composition A according to claim 7, wherein
the functional groups of the film forming resin a1) are selected from the group consisting of hydroxy, primary amine, secondary amine, mercaptane, activated unsaturated C=C moieties, carboxylic acid, epoxide, isocyanate, an activated methylene, methine species, and mixtures thereof, and/or the film forming resin a1) is selected from the group consisting of polyester resins, (meth)acrylic resins, polycarbonate resins, polyether resins, polyurethane resins, amino resins, and mixtures and hybrids thereof.

15. A crosslinkable composition comprising the resin composition A according to claim 7, further comprising a film forming resin b) and/or a film forming resin a1'), optionally, a crosslinker c), optionally, a catalyst d) for catalyzing the reaction of the functional groups of film forming resin a1) and/or film forming resin b) with crosslinker c) if present, and/or with film forming resin b) and/or with film forming resin a1'), optionally, a reactivity moderator e), optionally, a volatile organic compound f), optionally, a reactive diluent g), optionally, another resin h), and optionally, another delustering composition i) that is different from particulate polyurea compound a2), wherein the film forming resin a1), a1'), and b), and crosslinker c) if present, comprises at least two functional groups, each functional group having a functionality of at least 1, and/or at least one functional group having a functionality of at least 2;

wherein the film forming resin a1), and/or film forming resin a1') and/or film forming resin b) is reactable with film forming resin b) and/or film forming resin a1') and/or crosslinker c) if present; and wherein film forming resin a1') and film forming resin b) are different from film forming resin a1).

16. The crosslinkable composition according to claim 15, wherein the functional groups of the film forming resin a1') and b) are selected from the group consisting of hydroxy, primary amine, secondary amine, mercaptane, activated unsaturated C=C moieties, carboxylic acid, epoxide, isocyanate, an activated methylene, methine species, and/or the film forming resin a1') and b) is selected from the group consisting of polyester resins, (meth)acrylic resins, polycarbonate resins, polyether resins, polyurethane resins, amino resins, and mixtures and hybrids thereof.

17. The crosslinkable composition according to claim 15, wherein the crosslinker c) comprises an oligomeric or polymeric compound with the functional groups being selected from the group consisting of isocyanate, hydroxy, primary amine, secondary amine, mercaptane, activated unsaturated C=C moieties, carboxylic acid, epoxide, an activated methylene, methine species.

18. The crosslinkable composition according to claim 15, wherein the amount of polyurea compound a2) is between 0.5 and 25 wt % relative to the total amount of film forming resin a1), particulate polyurea compound a2), and if present, dispersing agent a3), non-volatile part of additive a4)-2, crosslinker c), film forming resin b), film forming resin a1'), catalyst d), reactivity moderator e), reactive diluent g), resin h), and delustering composition i), in the crosslinkable composition.

19. A process for coating an article or a substrate, said process comprising the steps of:
   (i) applying the crosslinkable composition according to claim 15,
   (ii) curing the applied composition,
   to give a reduced gloss coating having a gloss measurement of at most 45 gloss units at a 60° angle when applied at a Dry Film Thickness (DFT) of between 50 and 60 μm.

20. A substrate coated with a composition according to claim 15.

* * * * *